(12) United States Patent
Demorais et al.

(10) Patent No.: US 11,098,777 B2
(45) Date of Patent: Aug. 24, 2021

(54) OVERSIZED BRAKE PISTON FOOTING

(71) Applicant: MANDO CORPORATION, Gyeonggi-do (KR)

(72) Inventors: Antonio Eduardo Demorais, Novi, MI (US); Daniel Alan Smith, White Lake, MI (US); Suresh Babu Koduri, Novi, MI (US); Satish Kolekar, Farmington Hills, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/716,485

(22) Filed: Dec. 16, 2019

(65) Prior Publication Data
US 2020/0116219 A1    Apr. 16, 2020

Related U.S. Application Data

(62) Division of application No. 15/893,568, filed on Feb. 9, 2018, now Pat. No. 10,563,714.
(Continued)

(51) Int. Cl.
*F16D 55/30*  (2006.01)
*F16D 65/00*  (2006.01)
(Continued)

(52) U.S. Cl.
CPC ........... *F16D 65/005* (2013.01); *B60T 1/065* (2013.01); *F16D 55/225* (2013.01); *F16D 55/2265* (2013.01); *F16D 65/095* (2013.01); *F16D 65/18* (2013.01); *F16D 65/0068* (2013.01); *F16D 65/0971* (2013.01); *F16D 2055/0004* (2013.01); *F16D 2055/0016* (2013.01); *F16D 2121/04* (2013.01); *F16D 2125/06* (2013.01); *F16D 2125/34* (2013.01); *F16D 2125/36* (2013.01);
(Continued)

(58) Field of Classification Search
CPC ............ F16D 2125/06; F16D 2125/28; F16D 2125/34; F16D 2125/36; F16D 2125/40
See application file for complete search history.

(56) References Cited

U.S. PATENT DOCUMENTS 6,382,367 B1    5/2002 Varzescu et al.
8,561,762 B2    10/2013 Schupska et al.
(Continued)

FOREIGN PATENT DOCUMENTS

EP    1 391 628        2/2004
JP    11093991 A  *  4/1999  ............. F16D 65/14

OTHER PUBLICATIONS

Machine translation of JP-11093991 (no date).*
(Continued)

*Primary Examiner* — Nicholas L Jane
(74) *Attorney, Agent, or Firm* — Ladas & Parry, LLP

(57) ABSTRACT

A brake piston is described. The brake piston is configured for use in a disk brake system, the piston comprising: a body having an outside width perpendicular to a central axis; a footing disposed at a distal end of the piston; wherein the footing is configured to exert force on a brake pad during actuation of the disk brake system; the footing having a face configured to contact the brake pad, the face having a length and a width, wherein the length is longer than the outside width of the body, and the length is greater than the width.

6 Claims, 22 Drawing Sheets

Related U.S. Application Data

(60) Provisional application No. 62/486,961, filed on Apr. 18, 2017.

(51) Int. Cl.
| | | |
|---|---|---|
| *F16D 65/095* | (2006.01) | |
| *B60T 1/06* | (2006.01) | |
| *F16D 55/225* | (2006.01) | |
| *F16D 65/18* | (2006.01) | |
| *F16D 55/2265* | (2006.01) | |
| *F16D 55/00* | (2006.01) | |
| *F16D 121/04* | (2012.01) | |
| *F16D 125/06* | (2012.01) | |
| *F16D 125/36* | (2012.01) | |
| *F16D 125/34* | (2012.01) | |
| *F16D 125/40* | (2012.01) | |
| *F16D 65/097* | (2006.01) | |

(52) U.S. Cl.
CPC .. *F16D 2125/40* (2013.01); *F16D 2200/0004* (2013.01); *F16D 2200/0034* (2013.01)

(56) References Cited

U.S. PATENT DOCUMENTS

| | | |
|---|---|---|
| 8,567,574 B2 | 10/2013 | Roberts et al. |
| 9,850,971 B1 | 12/2017 | Demorais et al. |
| 2007/0209891 A1 | 9/2007 | Stensson et al. |
| 2011/0048869 A1* | 3/2011 | Schupska ............... F16D 65/18 188/71.1 |
| 2011/0132188 A1* | 6/2011 | Winkler ................. F16J 1/006 92/108 |
| 2015/0114769 A1 | 4/2015 | Kim |

OTHER PUBLICATIONS

Non-Final Office Action dated Jun. 19, 2019 for U.S. Appl. No. 15/893,568 (now published as 2018/0298963).

Notice of Allowance dated Oct. 11, 2019 for U.S. Appl. No. 15/893,568 (now published as 2018/0298963).

* cited by examiner

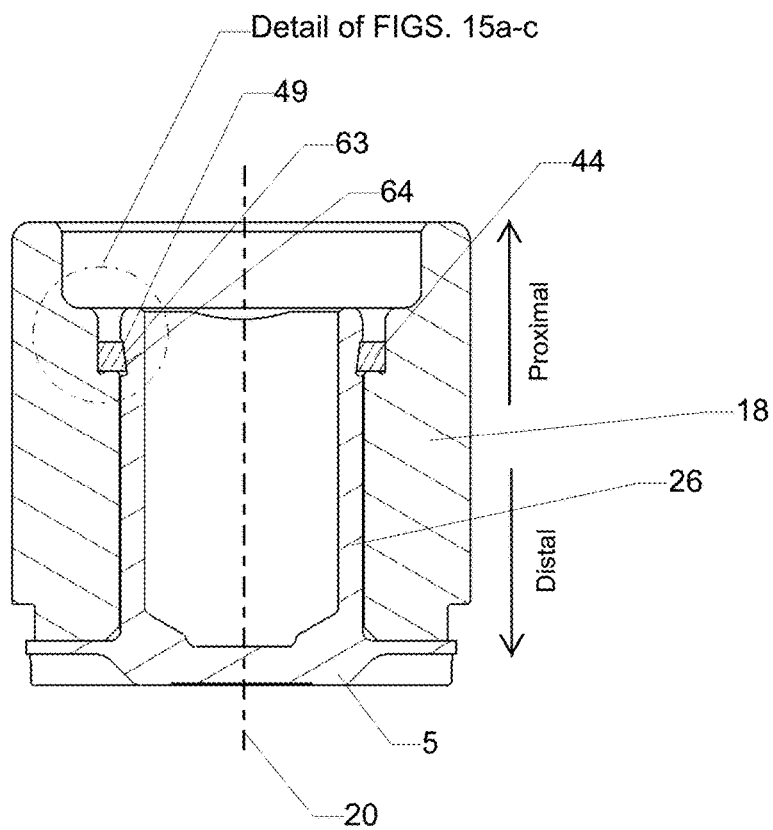
FIG. 14
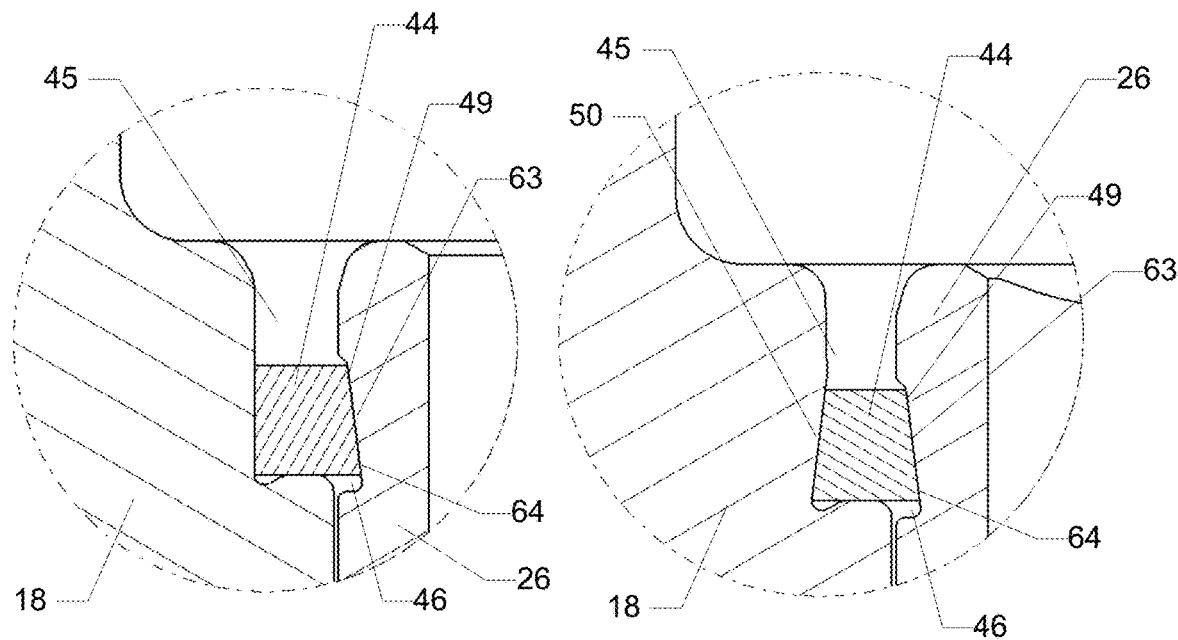
FIG. 15a
FIG. 15b

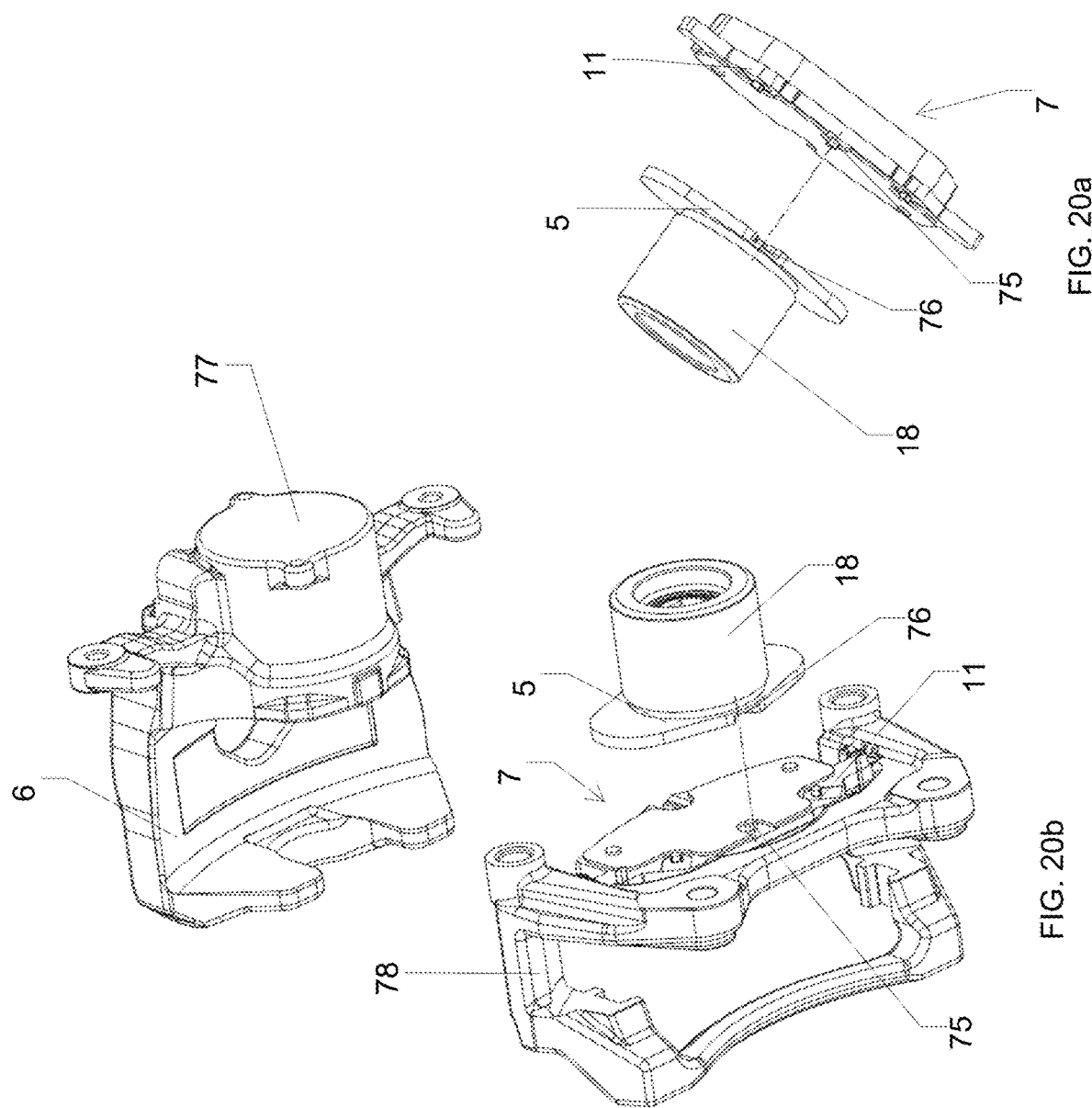

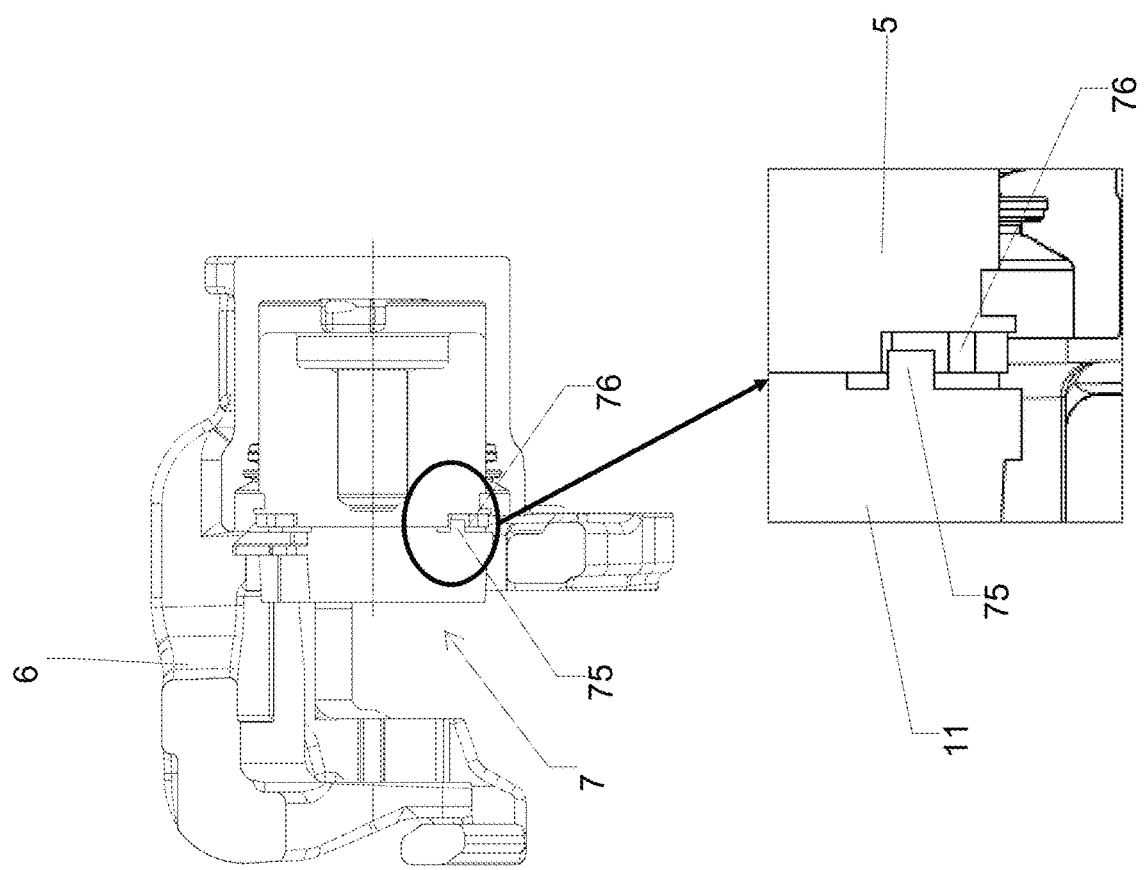

OVERSIZED BRAKE PISTON FOOTING

CROSS-REFERENCE TO RELATED APPLICATIONS

The present application claims the benefit of and is a divisional of U.S. Non-Provisional application Ser. No. 15/893,568, filed on Feb. 9, 2018, which claims priority to U.S. Provisional Appl. No. 62/486,961, filed on Apr. 18, 2017, the contents of which are incorporated herein by reference in their entirety.

TECHNICAL FIELD

This disclosure relates pistons for disk brake systems.

BACKGROUND

The present disclosure relates to disk brake caliper pistons and piston systems, such as are used for various vehicles including automobiles, trucks, aircraft and the like. Embodiments of the disclosure include pistons having provision for an oversized bearing surface for contacting a brake pad, retraction systems for retracting the portions of the piston and/or sealing systems internal to the piston.

As vehicles are made larger and heavier, greater braking force can be helpful in stopping the vehicle. Increased braking force can be accomplished in a number of ways, such as by pushing harder on the brake pedal, increasing the hydraulic advantage within the braking system to achieve greater pressure at the brake piston, increasing the number of brake pistons to increase the brake force achieved for a given hydraulic pressure or to increase the diameter of the piston to increase the brake force achieved for a given hydraulic pressure.

Increasing the number of pistons can result in problems with implementing a parking brake system integrated with the brake piston. The reason for this can include that the spindle/nut arrangement, shown for example in FIG. 5b, should be implemented on both pistons associated with a wheel or risk uneven wear and/or uneven application of brakes which can lead to other operational problems such as binding of the piston.

However, simply increasing the diameter of the piston is limited by the width of the brake pad.

In addition, increasing the pressure that the piston operates at to increase the force also carries a risk of distorting the brake pad due to the presence of a highly localized force (at the piston), which can also lead to uneven wear and other operational problems.

SUMMARY

In a first aspect disclosed herein a piston configured for use in a disk brake system is provided, the piston comprising: a body having an outside width perpendicular to a central axis; a footing disposed at a distal end of the piston; wherein the footing is configured to exert force on a brake pad during actuation of the disk brake system; the footing having a face configured to contact the brake pad, the face having a length and a width, wherein the length is longer than the outside width of the body, and the length is greater than the width.

In an embodiment of the first aspect, a piston assembly is provided, the piston assembly comprising: a brake piston comprising: a body having an outside width perpendicular to a central axis; a footing disposed at a distal end of the piston; wherein the footing is configured to exert force on a brake pad during actuation of the disk brake system; the footing having a face configured to contact the brake pad, the face having a length and a width, wherein the length is longer than the outside width of the body, and the length is greater than the width; a brake pad; a brake caliper housing; wherein, the brake pad is fitted to the caliper housing and configured to apply braking force to a rotor in operational communication with the piston assembly, and the brake piston is located within a cylinder located in the brake caliper housing, the footing of the brake piston located adjacent the brake pad; and the brake pad comprising clips configured to clip to the footing.

In a second aspect disclosed herein a disk brake piston is provided, the disk brake piston comprising: a load bearing column within a piston body, the load bearing column comprising: a footing configured to push against a brake pad; and a core extending from the metal footing and slidably located within the piston body; and a spindle nut located at least partially within the core, the spindle nut having an inner surface configured for functional communication with a spindle, and an outer surface in functional communication with the core, the outer surface having a first portion and the core having a corresponding portion, wherein the first portion and the corresponding portion prevent relative rotation of the core and the spindle nut; wherein the spindle nut is configured to contact and push the load bearing column which pushes on the brake pad.

BRIEF DESCRIPTION OF THE DRAWINGS

FIG. 5a shows an embodiment of a brake piston having an extended footing.

FIG. 5b shows a cross-section of the brake piston of FIG. 5a.

FIG. 7a shows an embodiment of a brake piston having an extended footing.

FIG. 7b shows a cross-section of the brake piston of FIG. 7a.

FIG. 7c is an additional view of the brake piston of FIG. 7a.

FIG. 10a shows an embodiment of a brake piston with a load bearing column construction.

FIG. 10b shows a cross-section of the brake piston of FIG. 10a.

FIG. 14 shows an embodiment of a brake piston with a coupler.

FIGS. 15a-d show embodiments of recesses for a coupler for a brake piston.

FIGS. 20a-c are schematics of a brake pad and piston showing a pip and V-groove.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
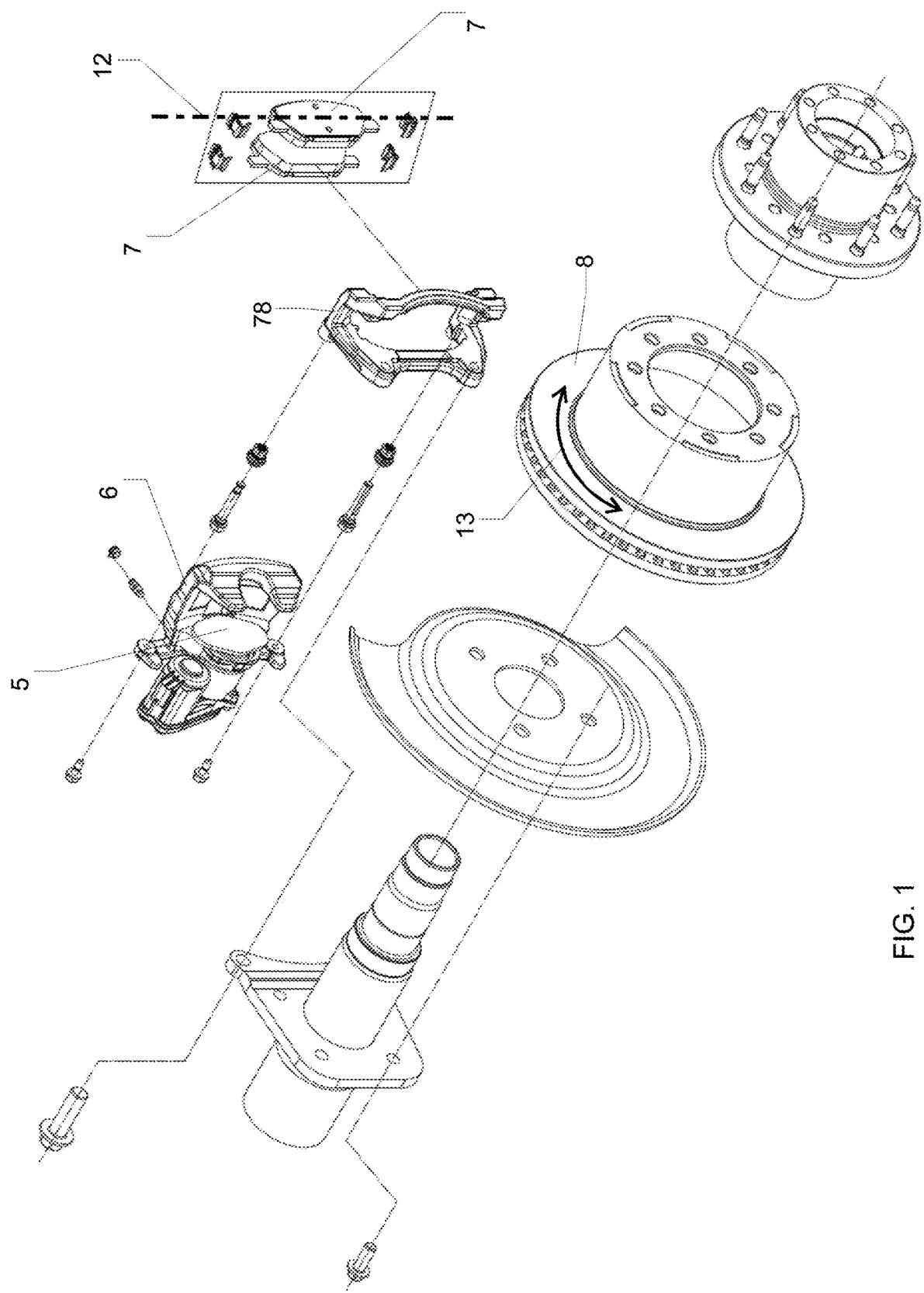
FIG. 1 is an exploded diagram of an embodiment of a brake system assembly.

FIG. 1 shows an embodiment of a brake system where a piston with an extended footing 5 is positioned in a caliper 6 where the extended footing 5 can press against brake pad 7 which in turn presses against rotor 8 during operation of the brake.

Figure 2:
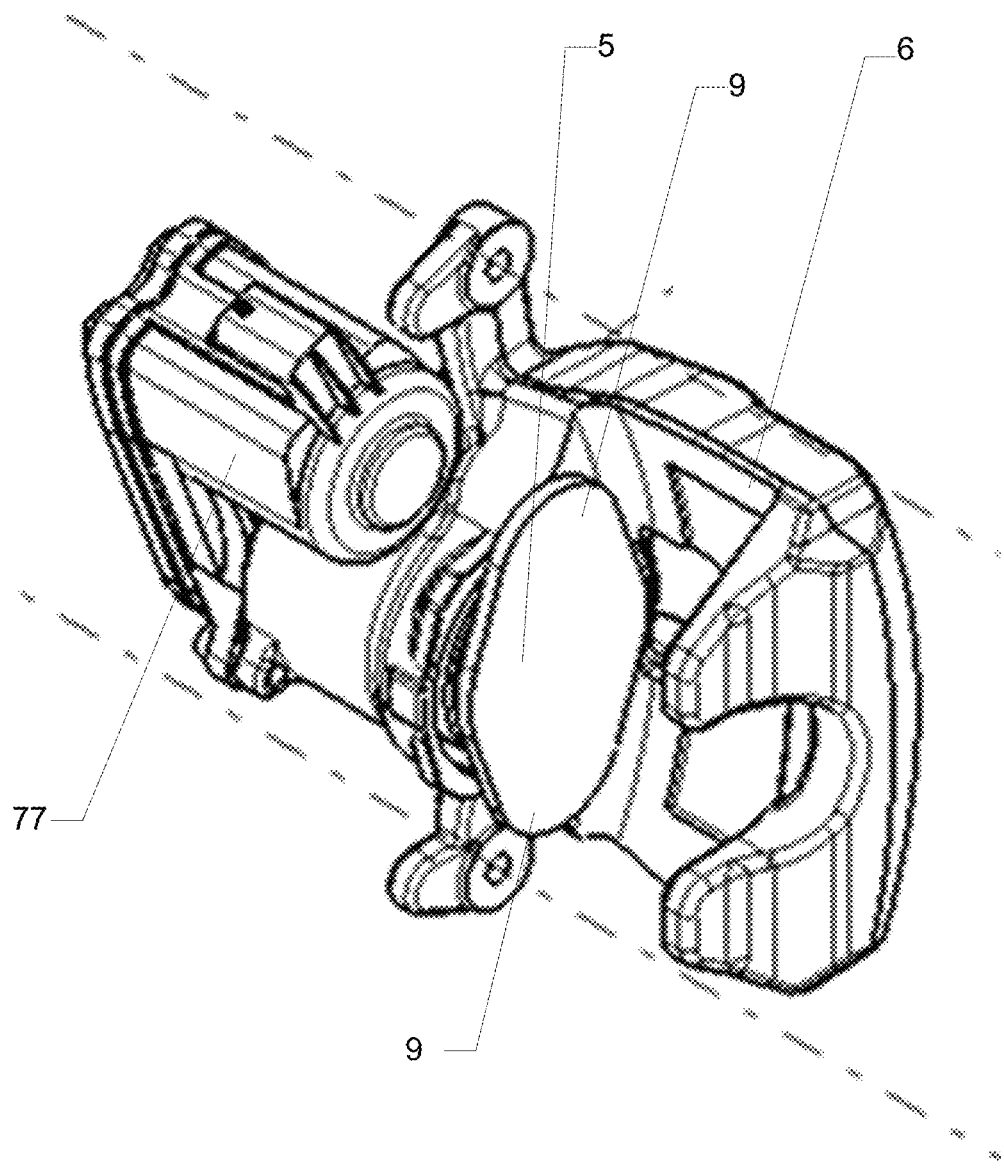
FIG. 2 shows an embodiment of a brake caliper including an embodiment of a piston having an extended footing.

FIG. 2 shows an embodiment of a brake caliper 6 with a piston and extended footing 5 where two extensions 9 of the footing are present. In some embodiments, one or more extensions 9 can be oriented along an axis of a brake pad 7, such as the long axis 12 of brake pad 7 which can be oriented along the direction of rotation 13 of the rotor 8, such as shown in FIG. 1. Also shown is motor 77 which can be used for actuating the brake, for example as a parking brake and a brake pad carrier 78.

Figure 19:
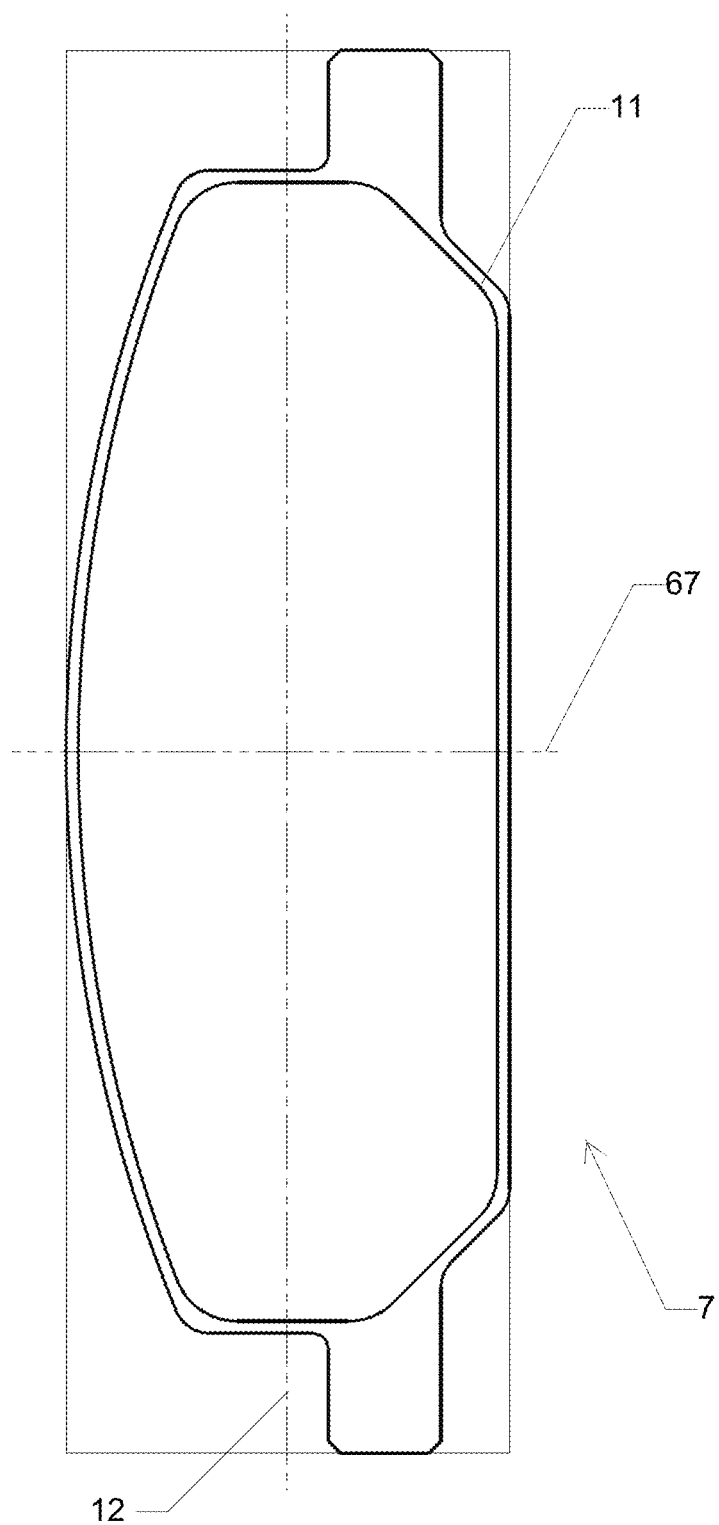
FIG. 19 is a schematic of a brake pad showing axes.

In some embodiments of a brake pad 7, a brake pad can be any shape, such as square, round, oval, bean, or other shape suited for the design of the braking system. Axes can be drawn through the brake pad by joining the midpoints of opposite sides of a rectangle or square which circumscribes the brake pad as shown in FIG. 19. In some embodiments, such as that shown in FIG. 19, the brake pad dimension measured along one axis will be longer (the long axis 12) than the other axis. Frequently, when one axis is longer than the other axis 67, the long axis can be oriented along the direction of rotation of the rotor, such as by being parallel or coincident with a line tangent to the rotor. However, in some embodiments, the long axis 12 of brake pad 7 can be oriented at an angle to a line tangent to the rotor (or to a line parallel to a tangent to the rotor), such as at an angle of 0 to 90 degrees, including all integer increments and ranges therebetween, such as 0, 5, 10, 20, 30, 40, 50, 60, 70, 80 or 90 degrees.

In some embodiments, when the one or more extensions 9 are oriented along the long axis 12 of brake pad 7, the extensions 9 can be oriented at an angle to the long axis 12 of brake pad 7 and/or offset from the long axis 12 of brake pad 7. In some embodiments, extensions 9 can be oriented parallel to long axis 12 or along long axis 12. In some embodiments, extensions 9 can be sized and oriented to correspond to the shape of the brake pad 7. In some embodiments, extensions 9 can be oriented at an angle of 0 to 90 degrees, including all integer increments and ranges therebetween, such as 0, 5, 10, 20, 30, 40, 50, 60, 70, 80 or 90 degrees, to the long axis 12 of brake pad 7.

In some embodiments, the extensions 9 can be offset from the long axis 12, such as by a percentage of the width of the brake pad backing plate 11. Suitable percentages include 0, 5, 10, 15, 20, 25, 30, 35, 40, 45 or 50 percent of the width of the backing plate 11.

Footing

Figures 5A, 5B:
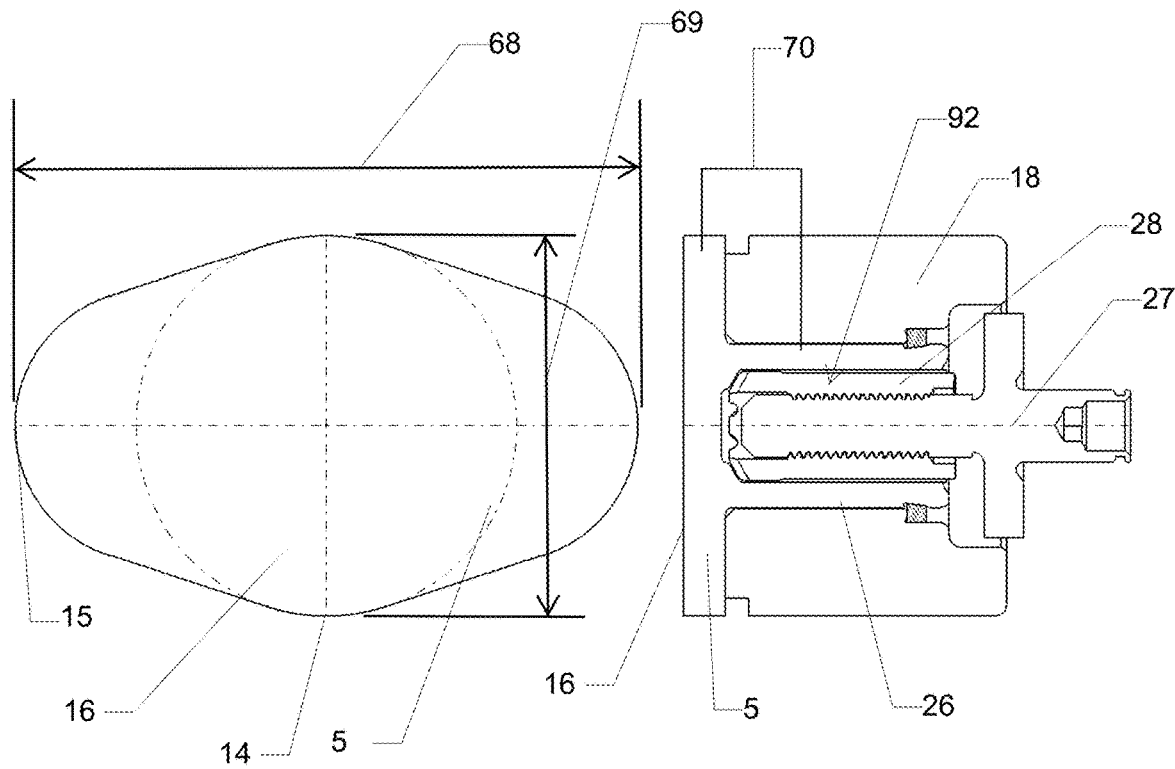
Figures 7A, 7B:
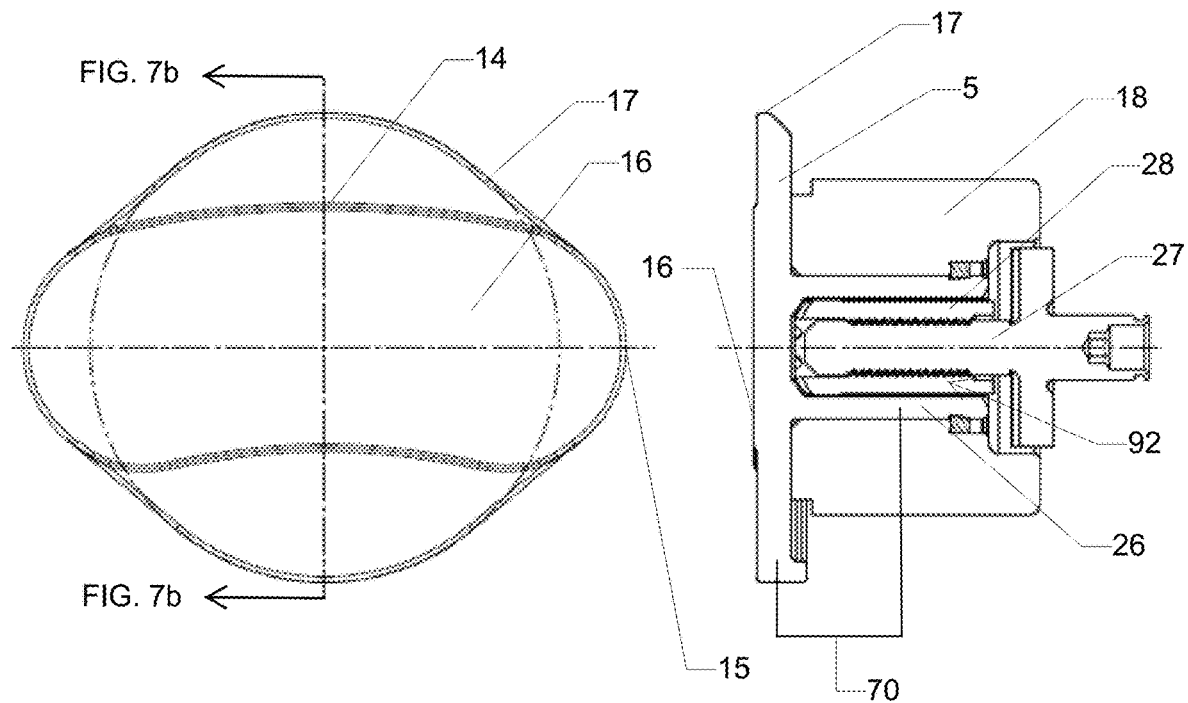

In some embodiments, an extended footing 5 can have a contact surface 16 (the surface which contacts brake pad backing plate 11 or a shim or other material located between the footing 5 and the brake pad backing plate 11) which is a raised surface on the footing 5 (as in FIGS. 7a and 7b) or flush with the face of the footing 5 (as in FIGS. 5a and 5b.)

In some embodiments, the contact surface 16 can have rounded sides 14 and ends 15, such as that shown in FIG. 5a. Other embodiments can have some combination of rounded or pointed or flat sides 14 and ends 15. Some embodiments can have an oval or ovoid shape while others can have more of a bean shape, such as that shown in FIG. 7a. Some embodiments can have straight sections located at one or more of side 14 and 15. Some embodiments can have sides 14 aligned with the outside diameter of the piston body 18, such as in FIGS. 5a and 5b, while some embodiments can have the sides 14 extending beyond the outside diameter of the piston 10 or located inboard of the outer perimeter 17 of the extended footing 5, such as in FIGS. 7a and 7b. Some embodiments can have a shape which corresponds to a portion of or the entirety of the brake pad or can have a scaled (larger or smaller) shape of the shape of the brake pad.

Figures 6, 8:
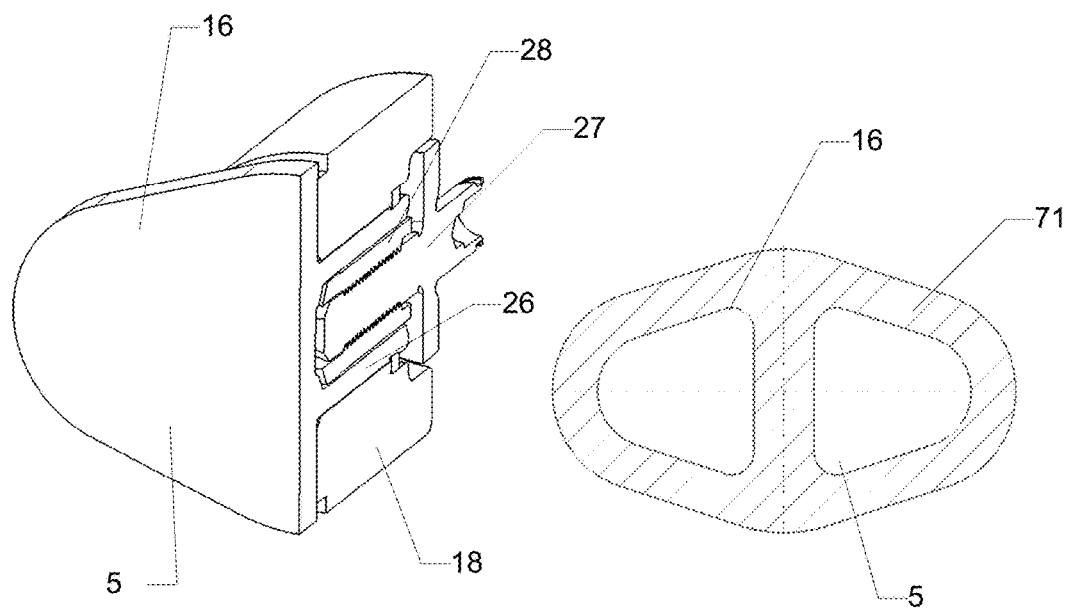
FIG. 6 shows an embodiment of a brake piston having an extended footing.
FIG. 8 shows a force pattern of an embodiment of an extended footing.
Figure 7C:
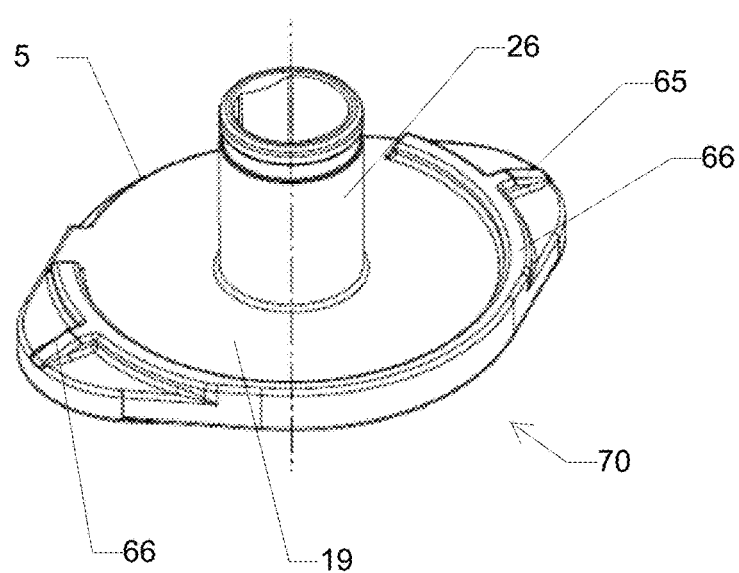

The reverse side 19 of the footing 5 (the side adjacent to the piston body 18), can be flat or substantially flat or can have sloped surfaces 65 and/or raised surfaces 66, such as those shown in FIG. 7c. In some embodiments, a sloped surface 65 can also be a raised surface 66. In some embodiments, the structure of the reverse side 19 of the footing 5 can be configured so as to distribute the force applied by the footing 5 to the brake pad 7 in a particular pattern. Some force patterns which can be used include those which provide a substantially uniform force across the contact surface of the footing 5. In some embodiments, the force can vary by no more than about 2%, 5%, 10% or 15% along the contact surface 16 of footing 5. In some embodiments, force can define a pattern of high force zones and low force zones, such as shown in FIG. 8, with the high force regions 71 shown in diagonal shading. In some embodiments, a pattern of higher force can be located closer to the center of the contact surface 16 and in some embodiments a pattern of higher force can be located closer to the ends 15 and/or the sides 14 of contact surface 16. In some embodiments, higher force regions can be located in some combination of locations closer to the center, closer to the sides 14, and/or closer to the ends 15 of contact surface 16.

Figure 3:
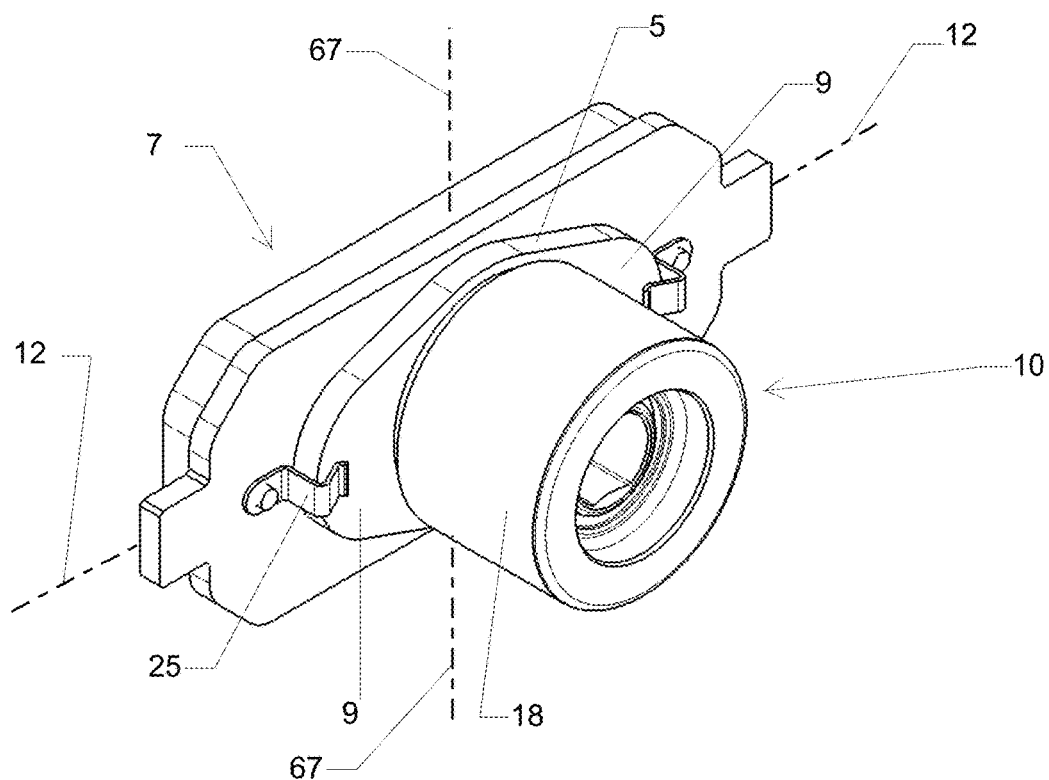
FIG. 3 shows an embodiment of a brake piston and brake pad.

In some embodiments, clips 25 (such as shown in FIG. 3) can prevent separation of the footing 5 from brake pad 7. Such clips can serve to retract brake pad 7 when during operation of the brake, the brake is released and the piston 10 retracts into the caliper 6. Suitable locations for the clip 25 can be adjacent to an end 15 of the footing 5, a side 14 of the footing 5, or at some location intermediate of a side 14 and an end 15 of the footing 5. In some embodiments, one, two, three, four or more clips can be used. In one particular embodiment, clip 25 can be a flat metallic strap affixed to the brake pad backing plate 11 by any suitable means, such as by bolting, riveting, welding, soldering, pinning, peening, cementing, gluing, and the like. In some embodiments, clip 25 can be a flat metallic strap which curves up over the edge of footing 5 with one, two, three or more bends in the strap.

Alignment of the Footing

In some embodiments, it can be desirable to maintain a particular alignment of the piston body 18 with the brake pad 7. Suitable methods to promote or maintain alignment of the piston 18 with the brake pad 7 can include interaction between features on the brake pad backing plate 11 and features on the footing 15. Suitable features can include interacting protrusion(s) or protrusion(s) that interact with recess(es). In one embodiment, as shown in FIGS. 20a-c, a pip 75 extends from a surface on the backing plate 11 and interacts with a groove, a recess or a V-groove 76 in the footing 5 to assist in limiting/preventing rotation of the piston 10 relative to the pad 7 and/or aligning the piston 10 relative to the pad 7. In some embodiments, a groove, recess or V-groove can be located at an edge of footing. In additional embodiments, location of the pip 75 or protrusion and location of the groove, recess or V-groove can be reversed with the pip 75 or protrusion being in the footing 5 and the groove, recess or V-groove can be in the backing plate 11. FIG. 20a shows the piston 10 and brake pad 7; FIG. 20b shows the piston 10 and pad 7 in the context of additional brake parts; FIG. 20c shows the piston 10 and pad 7 mounted in a brake assembly with a blown-up detail of the pip 75 and V-groove 76.

In another embodiment, the features can be clip(s) 25 attached to the backing plate 11 that interact with corresponding surface(s) of the footing 5, such that rotation of the piston relative to the brake pad 7 is limited or prevented or the piston 10 is aligned with the brake pad 10, such as is shown in FIG. 3. In some embodiments, the corresponding surface(s) of the footing 5 can be one or more edges of the footing and/or groove(s), recess(es) or V-groove(s) on the footing 5 and/or corresponding clip(s) on the footing 5. In some embodiments, a clip on the footing 5 can interact with one or more edges of the backing plate 11 and/or groove(s), recess(es) or V-groove(s) on the backing plate 11 and/or corresponding clip(s) on the backing plate 11.

In some embodiments, one or more of the features, such as protrusions, pips, grooves, recesses, V-grooves, clips, etc. can be located on a shim or other intervening structure between the brake pad and the piston to interact with the piston and/or brake pad to limit or prevent rotation of the piston in relation to the brake pad or to maintain alignment with between the brake pad and the piston.

Piston Body and Core and Footing

In some embodiments, a piston body 18 can be used with a load bearing column 70 which comprises a footing 5 and a core 26. The load bearing column 70 can transfer the force of the parking brake to the brake pad 7 without transferring substantial linear force to the piston body 18. The piston body 18 can be located with the footing 5 distal the piston body 18, as shown in FIGS. 5b and 6. In some embodiments the piston body 18 can be made separate from the footing 5. In some embodiments, footing 5 can be a metallic material, such as steel, iron or other suitable metal, including alloys. In some embodiments, piston body 18 can be a nonmetallic material, such as a plastic material, and in particular embodiments can be a phenolic material. In various embodiments, a core 26 can be present within piston body 18, as shown in FIGS. 5b and 6. Suitable materials for a core 26 can include metals, such as steel, iron or other suitable metal, including alloys as well as non-metallic materials as well. In some embodiments, core 26 can be made integral with footing 5, such as by casting, forging, spinning, coining, stamping, machining or the like, and in some embodiments core 26 can be joined to footing 5 such as by welding, soldering, gluing, cementing, threading, pinning or other suitable means. In some embodiments, core 26 can be slidably received into piston body 18. In addition, in various embodiments, core 26 can be rotatable within piston body 18 or non-rotatable, such as by inclusion of interacting surfaces on and inside diameter or at an end of piston body 18 and the outer surface of core 26 or the backside of footing 5. In some embodiments, an intervening material can be present between core 26 and piston body 18 and/or between footing 5 and piston body 18. Such intervening material can facilitate or impede movement, such as by increasing or reducing friction or by providing interference between contacting surfaces (such as by teeth, raised surfaces, noncircular surfaces, and the like.) Piston body 18 can be fabricated to be received into an opening in caliper 6, such as into a cylinder or other appropriately shaped opening. In some embodiments, body 18 can have provision for a seal to be present between body 18 and a wall of the opening in caliper 6. Suitable seals can include, for example, one or more O-rings and one or more O-rings grooves in the piston body 18 and/or wall of the opening in caliper 6. In some embodiments, a circular O-ring (circular cross-section) can be used while in some embodiments and O-ring of a different shape can be used, with or without circular O-rings, such as square cut or wedge or "v" or other suitable shape. Present within core 26 can be a spindle 27 and/or a nut 28, for example as shown in FIGS. 5b and 6.

Piston Body and Spindle Nut

Figure 4:
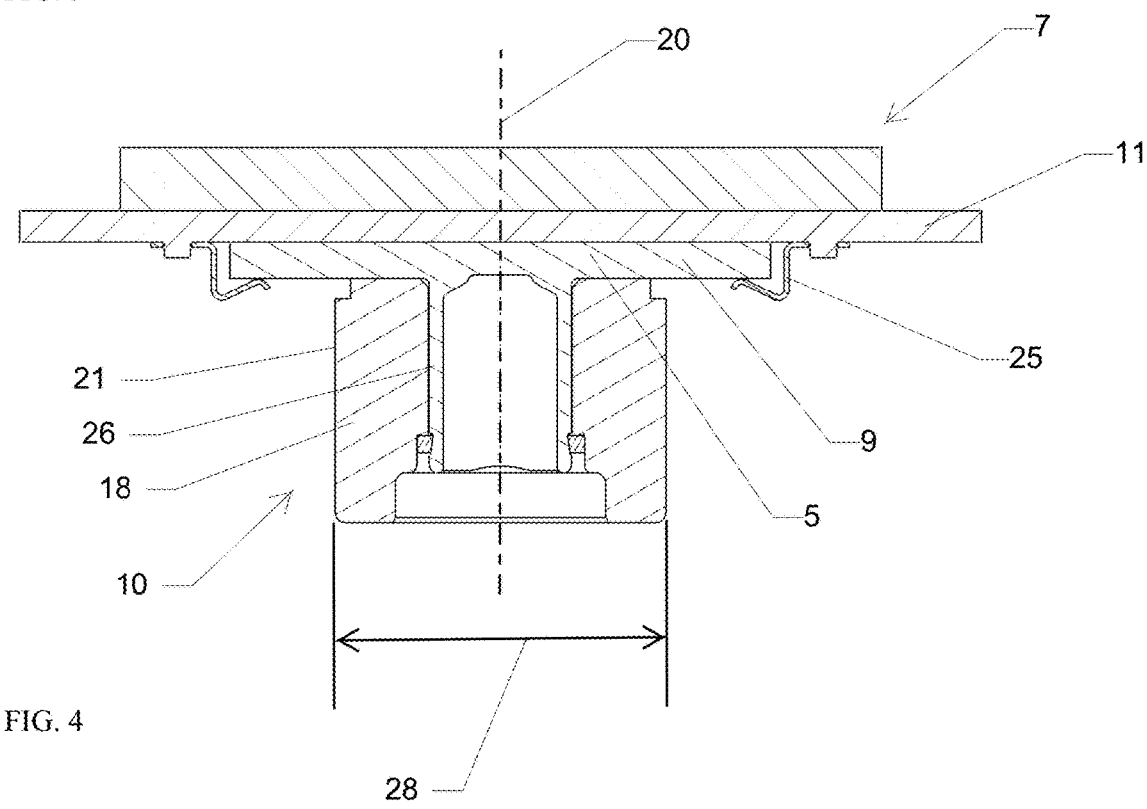
FIG. 4 shows an embodiment of a brake piston and brake pad.
Figure 5C:
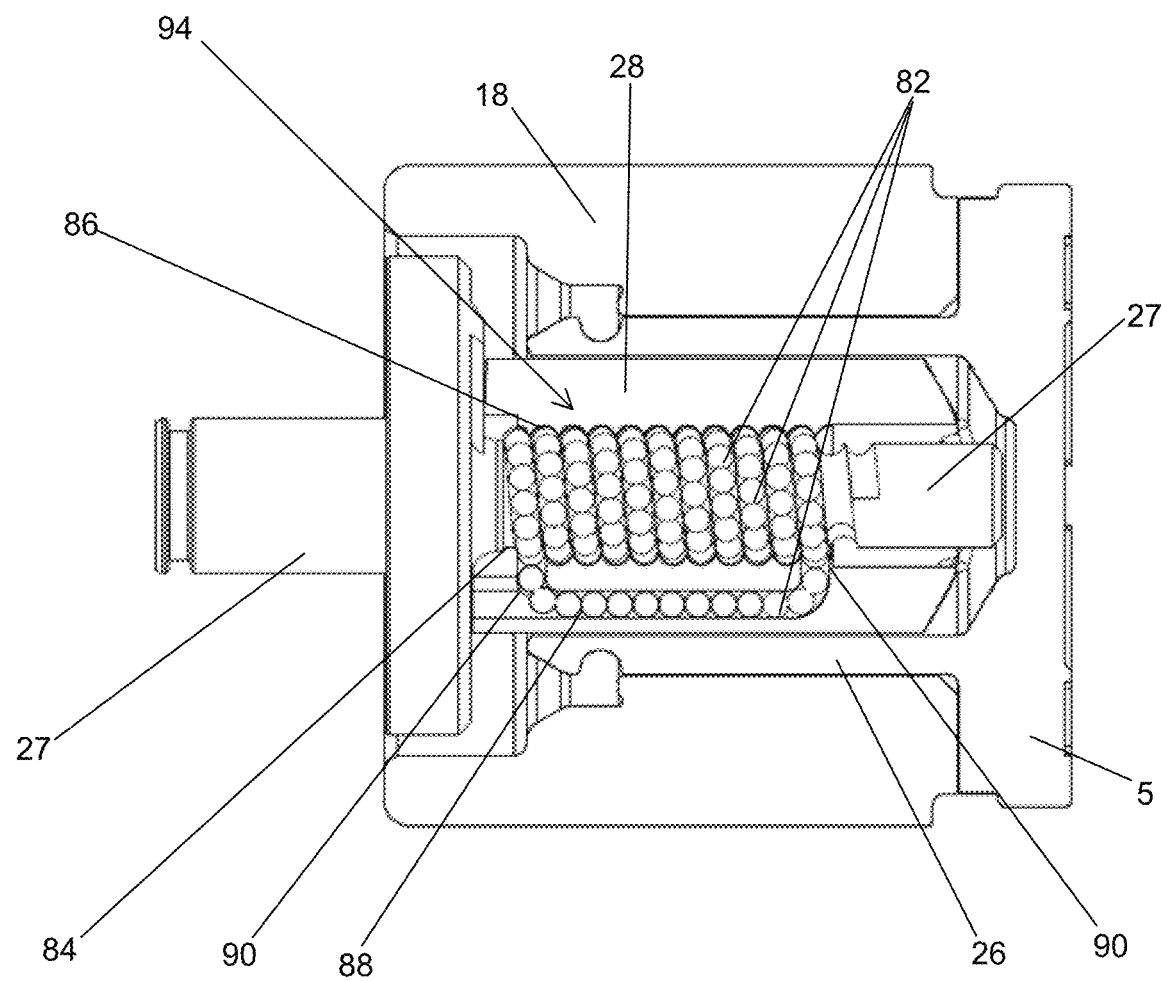
FIGS. 5c-5f show embodiments of a brake piston utilizing a ball screw.
Figure 5D:
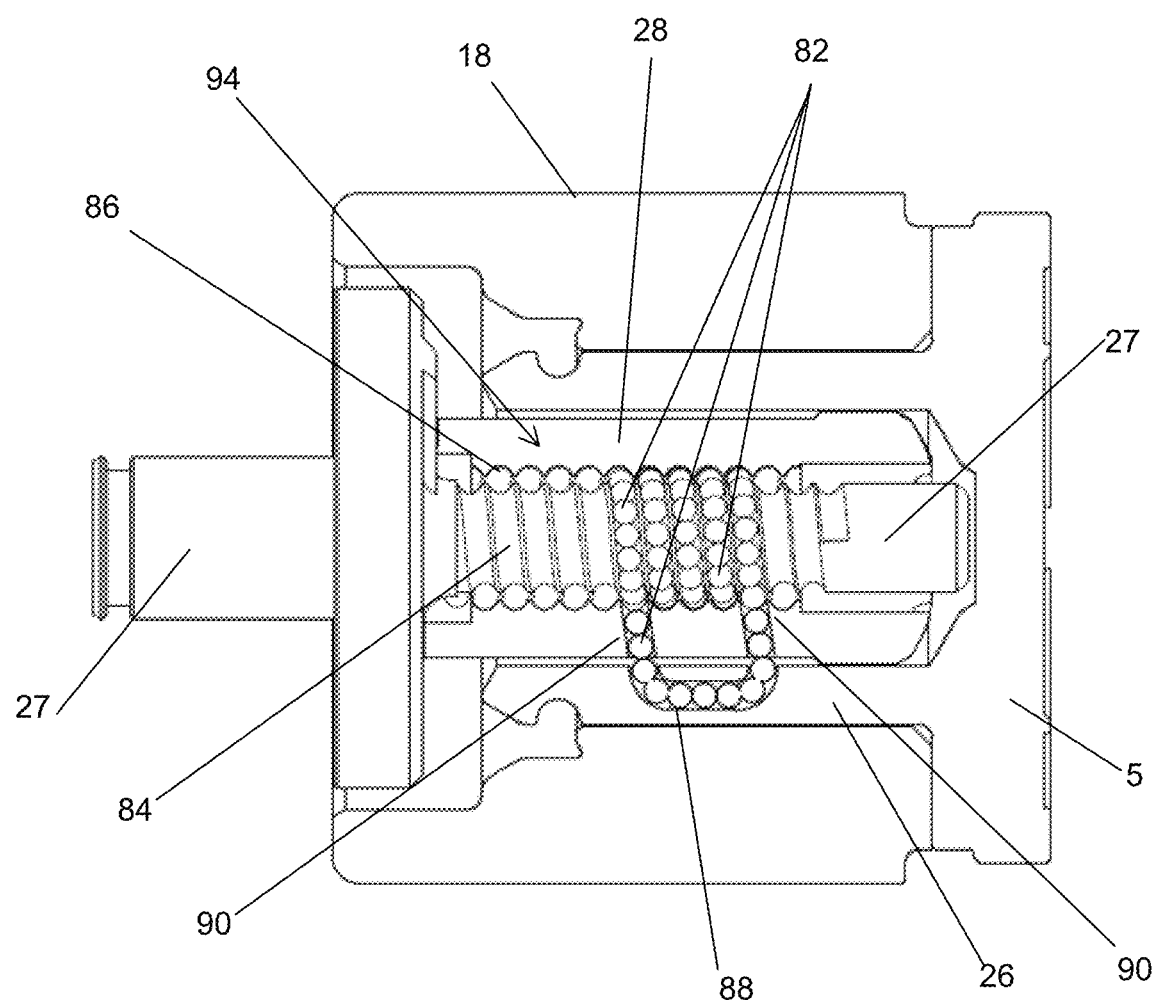
Figure 5E:
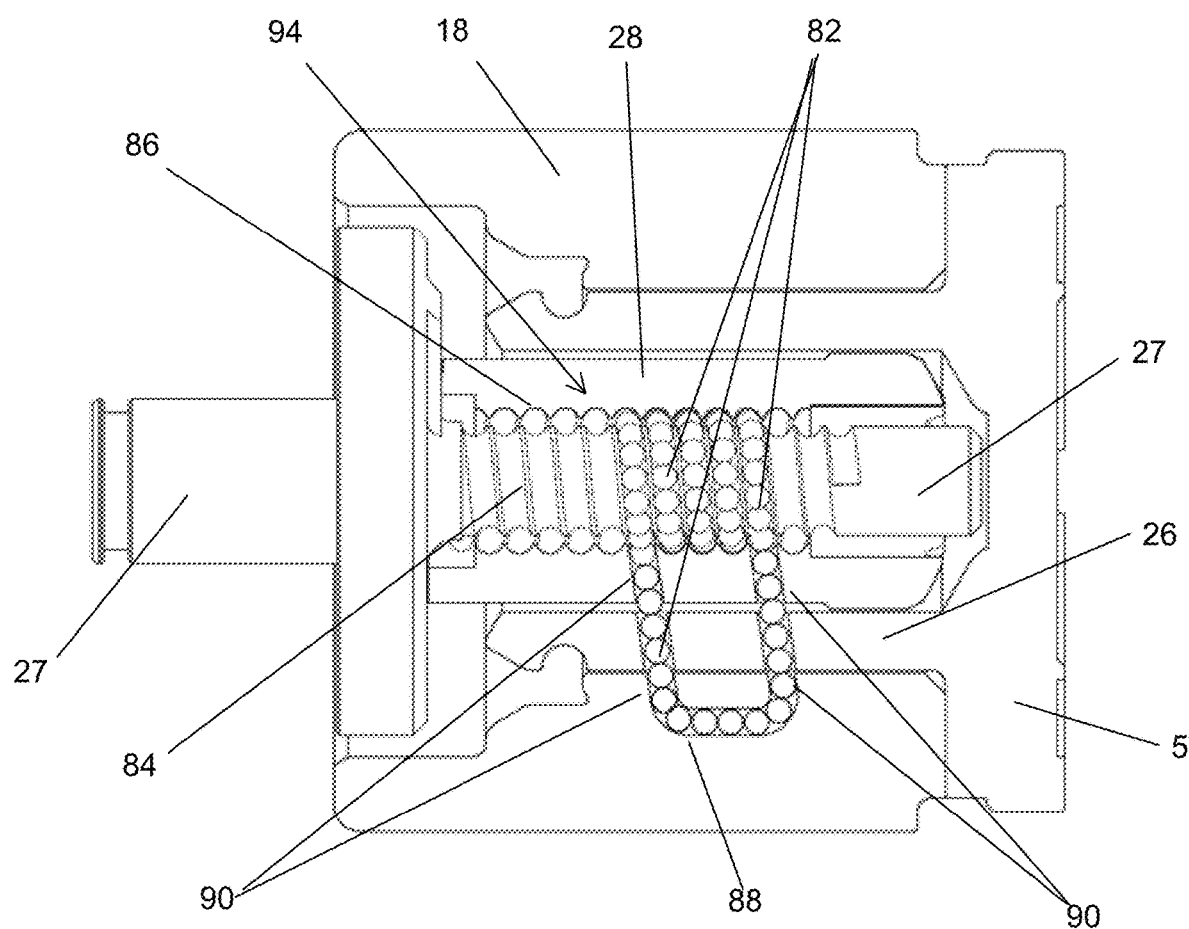
Figure 5F:
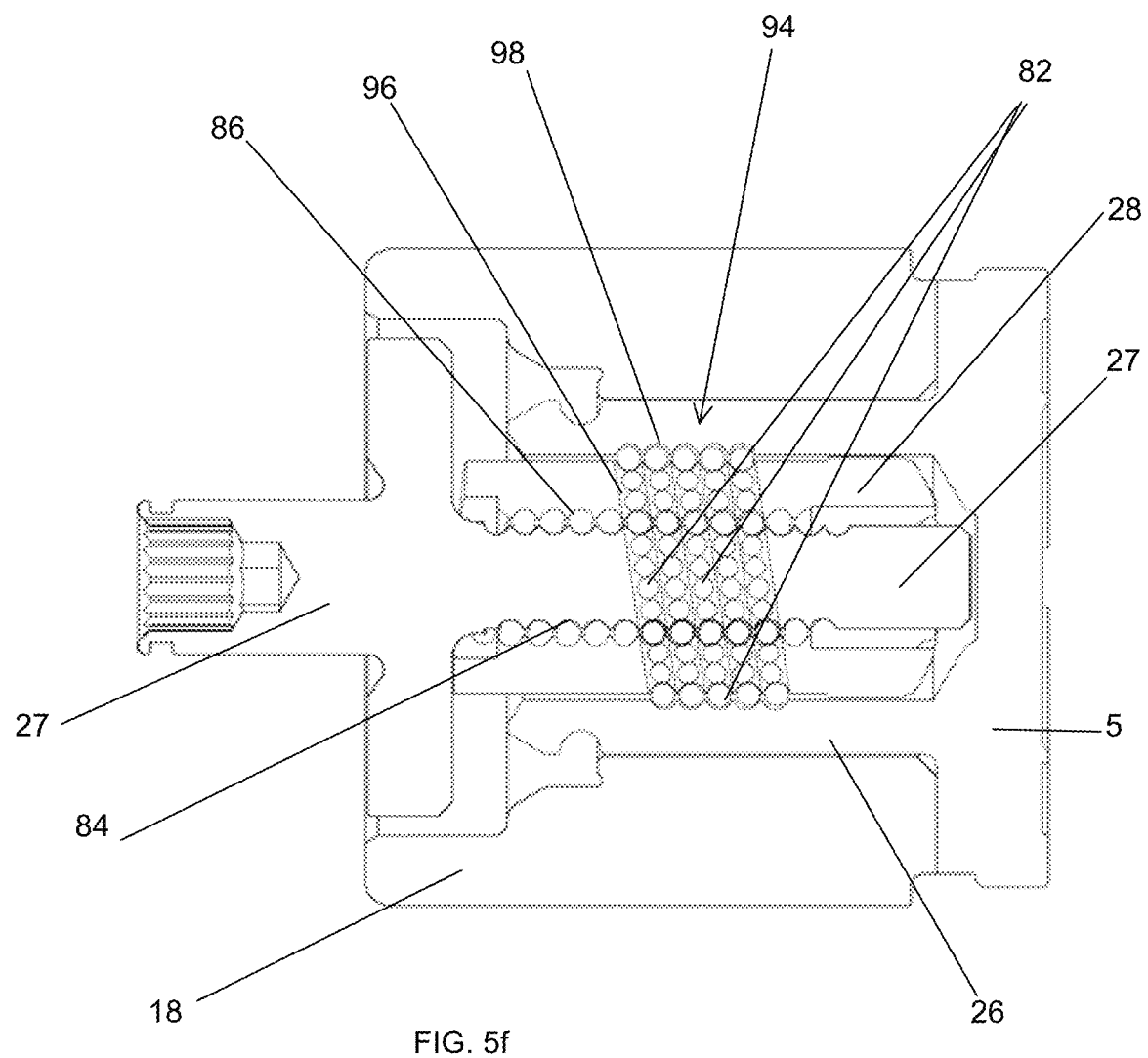

Spindle nut 28 can be used as a part of a parking brake mechanism such as by being actuated by a spindle 27 and moved in a linear direction. The spindle nut 28 can be threadably coupled to the spindle 27. In some embodiments, the spindle 27 can pass through a central region of the spindle nut 28 where threads 92 on the outside of the spindle 27 interface with threads 92 on the interior of the central region of spindle nut 28. (See FIGS. 5b and 6.) In various embodiments, the threads can be any suitable style of thread 92, such as those having a V-shape or a square shape or a trapezoidal shape or a round shape or an ACME thread shape. In some embodiments, the threads can be screw thread used in a leadscrew. In some embodiments, the threads can be those used in a ball screw, such as ball screw threads 94 shown in FIG. 5c, FIG. 5d, FIG. 5e or FIG. 5f. In some embodiments of threads for a ball screw 94, an inner helical raceway 84 can be present on the spindle with a corresponding outer helical raceway 86 on spindle nut 28 and balls 82 located within and moving along the inner helical raceway 84 and the outer helical raceway 86 and through a recirculation loop 88. In FIG. 5c, the balls 82 are recirculated through a loop 88 in the nut 28. In FIG. 5d, the balls 82 are circulated through a loop 88 in the core 26 by way of passages 90 in the nut. In FIG. 5e, the balls 82 are circulated through the body 18 by way of passages 90 in the nut 28 and core 26. In FIG. 5f, the balls are circulated through a secondary set of helical inner and outer raceways located separated from the primary helical raceways, such as where the secondary set of helical raceways are located external to the spindle-nut interface, and in some embodiments can be wrapped around the primary helical raceways, for example where the secondary raceways comprise a secondary inner raceway 96 (e.g. on the outer surface of the spindle nut 28) and a secondary outer raceway 98 (e.g. on the inner surface of the core 26) between the core 26 and the nut 28. In some embodiments, the secondary raceways can serve as the return loop for the other raceways or the other raceways can serve as the return loop for the secondary raceways. In some embodiments, the secondary inner raceway can correspond to the secondary outer raceway to define a channel for the balls. In some embodiments, the helical raceways can run for the length of the nut 28, spindle 27 and/or core 26, or for only a portion of the length of the nut 28, spindle 27 and/or core 26. Operation of the parking brake can be accomplished by rotating the spindle 27 in relation to the nut 28 resulting in the nut 28 moving linearly toward or away from the brake pad 7. (Compare FIG. 5b and FIG. 4.) Suitable actuators for a parking brake can include motors, levers, handles and the like.

Figure 9:
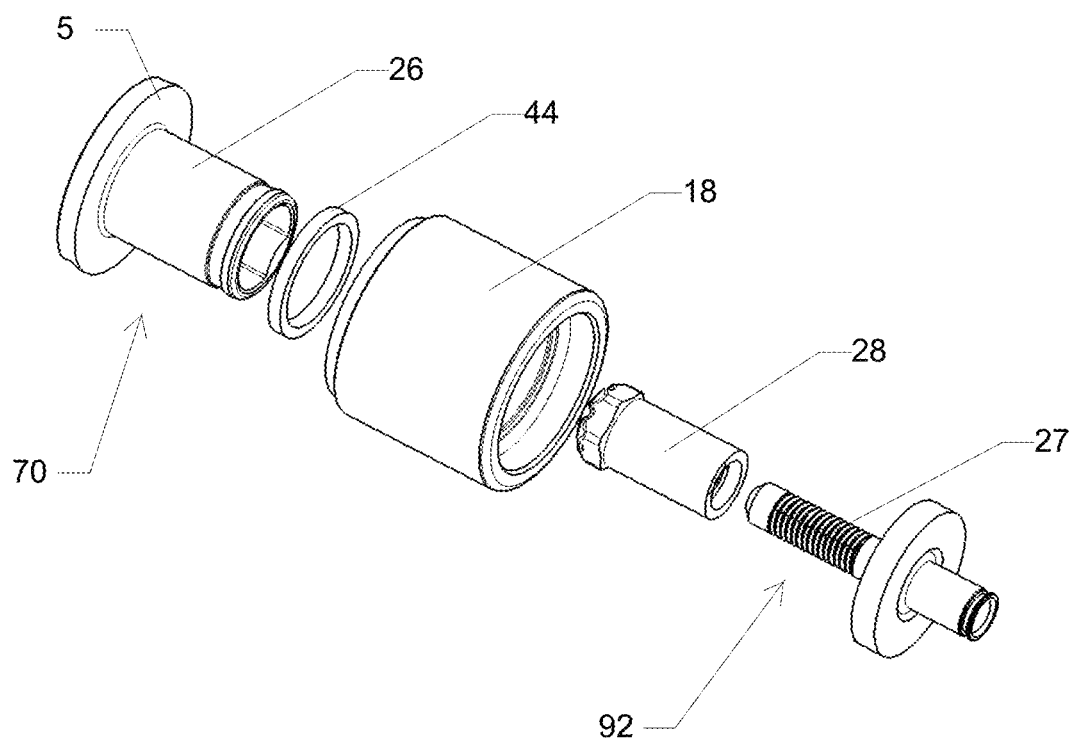
FIG. 9 shows an exploded diagram of an embodiment of a brake piston.
Figure 13:
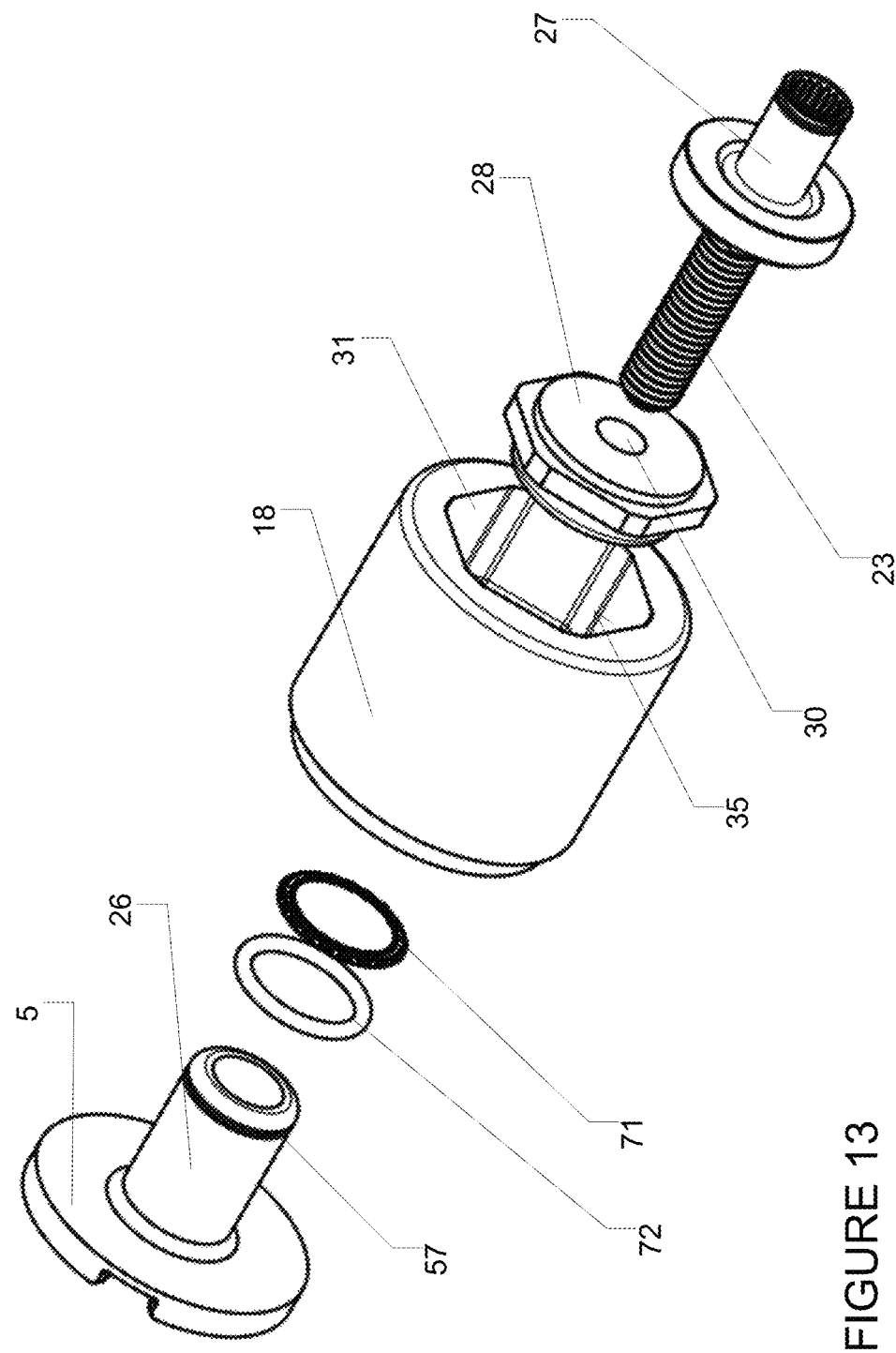
FIG. 13 shows an exploded diagram of an embodiment of a brake piston with a load bearing column construction.

The piston body 18 can have one or more internal surfaces 31 for interfacing with a spindle nut 28, as shown in FIG. 13, which can be positioned within the piston body 18, and the internal surface(s) serve to limit and/or prevent relative rotation between the spindle nut 28 and the piston body 18. The core 26 can have one or more internal surfaces 32 for interfacing with a spindle nut 28, as shown in FIG. 9, which can be positioned within the core 26, and the internal surface(s) serve to limit and/or prevent relative rotation between the spindle nut 28 and the core 26. The internal surfaces 31, 32 of the piston body 18 or core 26, respectively can also be configured to allow the nut to move axially in a direction substantially parallel to a central axis 20 of the piston 10.

The central axis 20 and the brake pad end of the piston 10 can be configured such that the central axis 20 is perpendicular or substantially perpendicular to the footing 5.

The internal surface 31, 32 of the piston body 18 or core 26 can be configured to comprise 3 flat surfaces 31, 32 on the inside of the piston body 18 or core 26, or six flat surfaces 31, 32 arranged so as to interface with a spindle nut 28 such as a hexagonal shaped spindle nut 28, or only 1 or only 2 flat surfaces 31, 32. However, in various embodiments, the internal surface of the piston body 18 or core 26 can be configured to comprise various numbers of flat surfaces 31, 32, such as 1, 2, 3, 4, 5, 6, 7, 8 or more and the flat surfaces 31, 32 can be configured to interface with a nut having a suitable number of flat surfaces 48, such as the same number of flat surfaces, or greater than or fewer than the number of flat surfaces 31, 32 on the piston body 18 or core 26 and the number of flat surfaces 48 on the nut 28 can be 1, 2, 3, 4, 5, 6, 7, 8 or more. In addition, one or more or all of the flat surfaces 31, 32 and/or flat surfaces 48 on the nut can be replaced with curved surfaces, such as curved surfaces having a higher or lower radius of curvature than a radius of curvature of the interior or exterior of the piston body 18/core 26 or spindle nut 28, and the curved surfaces of the inside of the piston body 18 or core 26 can be curved outward (having a center of curvature toward or beyond the central axis 20) or inward (having a center of curvature away from the central axis 20). In some embodiments, the flat or curved surfaces of the internal surface of the piston body 18 or core 26 which interface with the spindle nut 28 can be linked by sharp corners, or by radiused corners, or by circular cut-out corners or by additional flat surfaces.

In some embodiments, the surfaces 48 of the spindle nut 28 corresponding to the flat or curved surfaces 31, 32 of the piston body 18 or core 28 can be flat or curved or some combination thereof and configured to interface with the flat or curved ends of the piston body 12 to limit, restrict or prevent relative rotation between the piston body 12 and the spindle nut 4.

Figures 10A, 10B:
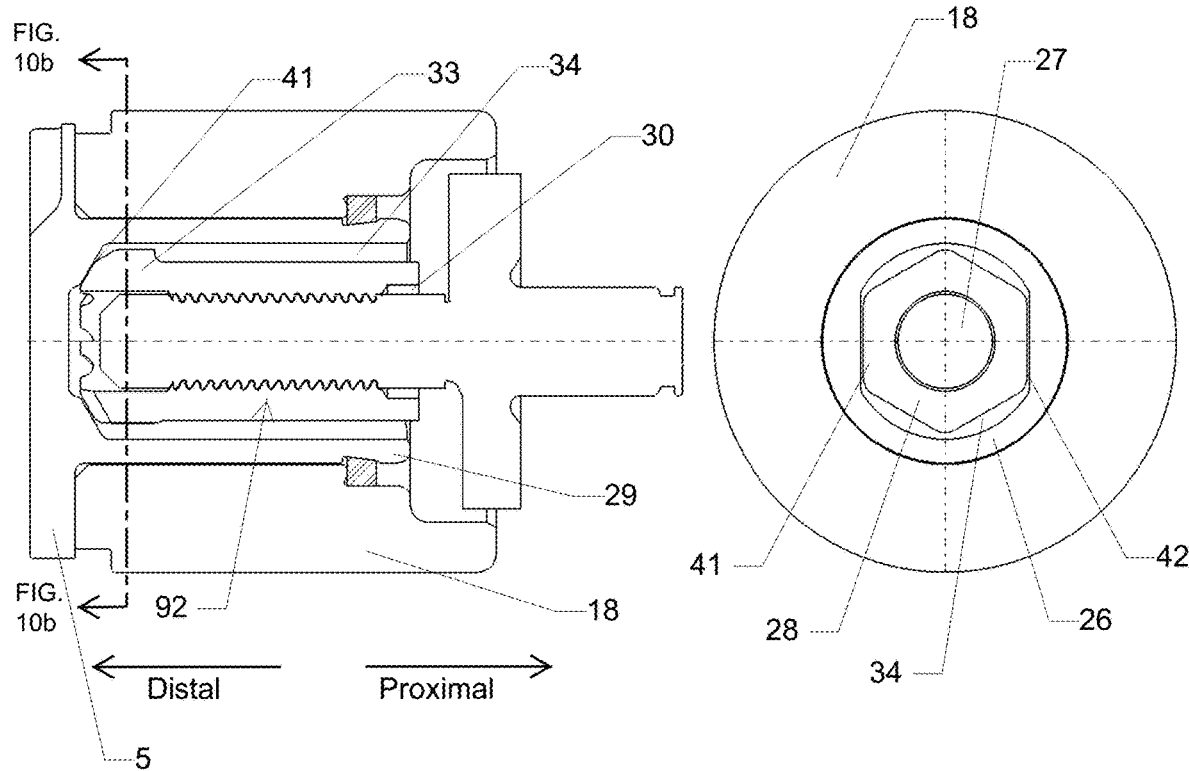

The spindle nut 28 can also include a threaded interior surface which operationally engages the threaded elongate portion 23 of the spindle 27. The spindle nut 28 can be internally threaded for only a portion of its length, as shown in FIG. 10a, or for its entire length. The nut can include a flanged section 33 or outer surface 31, 32, which can include one or more surfaces which engage the piston body 18 or core 26 in the internal cavity 35 or 34, respectively, to limit, restrain, impair or prevent relative rotation of the piston body 18 or core 26 and the spindle nut 28.

Figure 11:
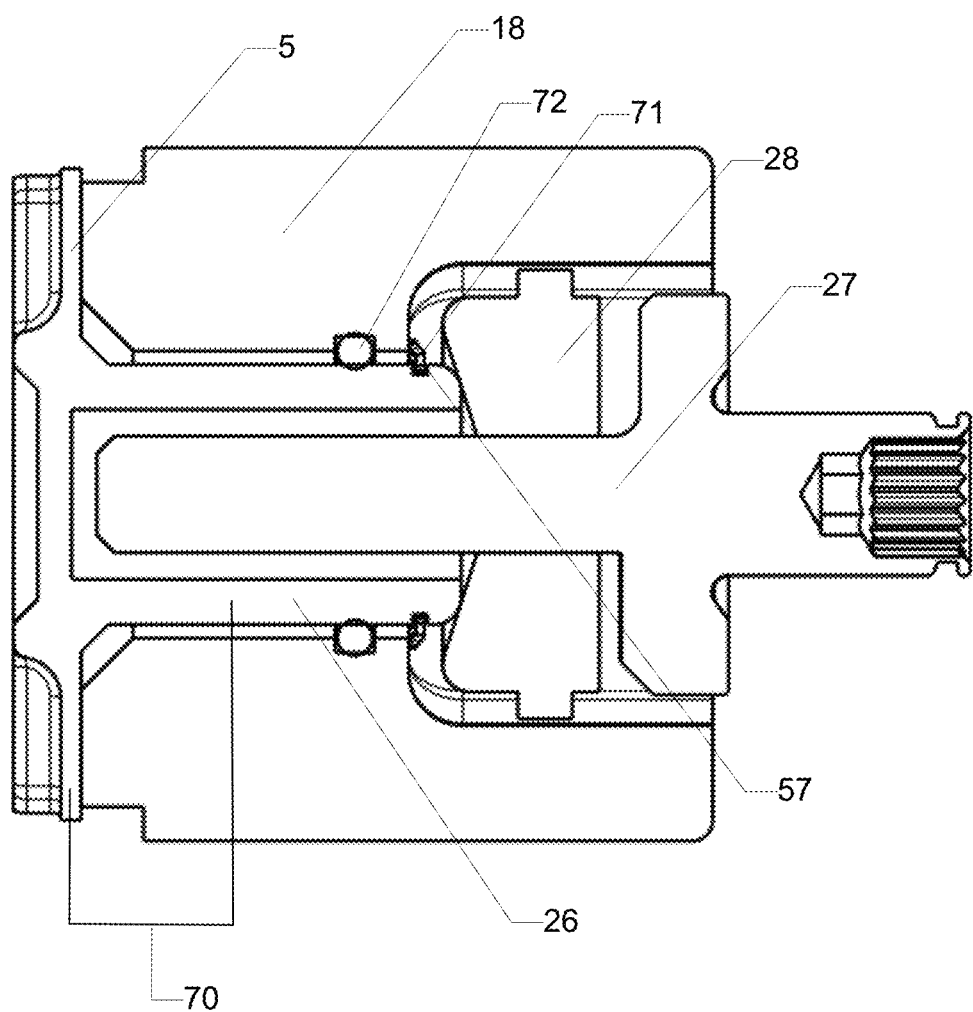
FIG. 11 shows an embodiment of a brake piston with a load bearing column construction.

The spindle nut 28 can also include a flat surface or a hollow 36 on the surface facing the core 26, for example as shown in FIG. 11. Such a hollow 36 can be sized to receive an end of the core 26, such as a proximal end 29, and in some embodiments provide stability to the core 26 and/or the footing 5 or to aid in aligning the core 26 with the spindle nut 28. In some embodiments, the hollow can have a conical shaped surface as shown in FIG. 11. In some embodiments, the end of the core 26 can contact the surface of hollow 36 at a location between the peak 37 and the base 38 of the hollow, such as midway along the surface, or at a location closer to the peak or closer to the base.

In some embodiments, the core 26 can have an end which contacts the spindle nut 28 which is beveled or rounded. In some embodiments, the end of the core 26 which contacts the spindle nut 28 can have a shape which is complementary to the shape of the hollow 36 of the spindle nut 28. For example, the complementary shapes can include a cylindrical end to the core for a cylindrical hollow 36, or a conical end to the core for a conical shaped hollow 36. In some embodiments, the core end can be cylindrical or cylindrical with a rounded end and the hollow 36 can be conical. In some embodiments, the core end can include a hollow to receive a portion of the spindle nut 28 and at least one of the core end and the portion of the spindle nut 28 received in the core end hollow can have a conically shaped surface. In some embodiments, a retainer clip 71 can be present in a retainer groove 57, such as shown in FIG. 11, to hold the core 26 in position in the piston body 18. Also, as shown in FIG. 11, a seal 72, such as an O-ring can be present between the piston body 18 and the core 26.

In some embodiments, a contact surface of the spindle nut 28 can contact a portion of the core other than a proximal end to exert a later force on the core in the direction of the bake pad 7. In one embodiment, a distal end 41 of the spindle nut 28 can contact an internal surface of the core 26. In some embodiments, such as is shown in FIG. 10a (and cross-section FIG. 10b), distal end 41 of nut 28 contacts a distal surface 42 of core 26 proximate the footing 5. In some embodiments, the contact surface of the spindle nut 28 can contact a surface of the core 26 located intermediate the footing 5 and the proximal end 29 of core 26. In some embodiments, the contact surface of the nut 28 can be located intermediate the distal end 41 and the opening 30 of the nut 28 that receives the spindle 26. In some embodiments, spindle nut 28 can contact a back side of the footing exposed inside the core 26. In some embodiments, the distal end 41 of the nut can include holes or passages 47 to allow fluid to pass around and/or through the distal end 41 of spindle nut 28, shown for example in FIG. 9.

In the various embodiments, features described in the alternative, for example curved ends and flat surfaces for the interior surface of the piston body and the exterior surface of the nut can be interchanged within the disclosure where only one of the alternatives is described, except where the context indicates otherwise.

In some embodiments, the piston body 18 and/or the spindle nut 28 and/or core 26 and/or spindle 27 can be sized and dimensioned to reduce the open volume in the piston that would be filled with fluid during operation. In some embodiments, a wall thickness of the piston body 18 can be increased. In some embodiments, the piston body 18 can be configured with a first zone 39 having a different wall thickness than a second zone 40. Such a configuration where the first zone 39 has a thicker wall than the second zone 40, such as that shown in FIG. 11, is able to reduce the fluid volume while also achieving or maintaining a large hydraulic area for hydraulic operation of the brake (or pneumatic area for pneumatic operation of the brake.) In some embodiments, the wall thickness can be varied by changing the diameter of the central bore and/or the internal cavity 34 or 35 of the core or piston body, respectively.

In some embodiments, it can desirable to configure the piston to utilize a lighter material, such as a phenolic to reduce the fluid volume of the piston by utilizing thicker walls for the piston body. Such a configuration can reduce the fluid volume and reduce the weight of the piston.

In some embodiments, other parts of the brake piston can be increased in size to reduce the fluid volume such as the diameter of the elongate portion 23 of the spindle, a length and/or diameter of the spindle nut 28 and/or the spindle 27. In some embodiments, one or more dimensions of the core 26 can be varied to reduce the fluid volume, such as the diameter, wall thickness and length.

Footing

The footing 13 generally can have a first face (contact surface 16) proximate a disc brake pad 7 and a second face (reverse side of footing 19) proximate an end of the piston body 18. In some embodiments, the footing 5 can cover the entirety of the end of the piston body 18, extend past the edges of the piston body 18, or cover less than the entirety of the end of the piston body 18. In some embodiments, footing 5 when assembled with piston body 18 can be embedded or partially embedded in the end of piston body 18 or can extend from the end of piston body 18. In some embodiments, footing 5 can contact the end of piston body 18 and in some embodiments there can be an intervening structure, such as a washer or series of washers which can in some embodiments serve to modify the ability of footing 5 to rotate in relation to piston body 18. Such rotation modification can take the form of friction increasing or friction reducing surfaces or can provide interlocking or inter-meshing lugs or protrusions and corresponding recesses. In some embodiments, the second face of the piston body can include rotation modification structures such as lugs or protrusions and corresponding recesses between the second face of footing 5 and the end of piston body 18. In some embodiments, footing 5 can be embedded in the end of piston body 18 and have an outer diameter defining a shape corresponding to the inner diameter of the end of piston body 18 wherein the interaction between the corresponding outer diameter and inner diameter limits or eliminates relative rotation between footing 5 and piston body 18. In some embodiments, a combination of the corresponding inner and outer diameters and rotation modifying surfaces between the face of footing 5 and end of piston body 18 and/or intervening structures and/or intervening structures with rotation modifying surfaces can be used together.

In some embodiments, footing 5 can include anti-rotation lugs or recesses on the first face of footing 5 which correspond to recesses or lugs on brake pad backing plate 11 or which correspond to recesses or lugs on a part functionally connected to the brake pad positioned between the footing 5 and brake pad 7. In use, the anti-rotation lugs or recesses on footing 5 can interact with the corresponding recesses or lugs to prevent rotation of footing 5 in relation to brake pad 7 and/or piston body 18. In some embodiments, the anti-rotation lugs can align the footing 5 with the brake pad 7.

In some embodiments, the brake pad 7 and/or a part functionally connected to the brake pad and positioned between the footing 5 and brake pad 7 can include a socket or recess or indentation to receive the first end of steel footing 5 and the shape of the outer diameter of steel footing 5 corresponds to the inner diameter of the socket/recess/indentation so as to prevent relative rotation between the two parts. In various embodiments, the corresponding shapes can include noncircular portions or can provide interfering features such as protrusions, such as splines, or ovalized shapes, shapes including flat surfaces, polygons, arcs with intervening flat surfaces or multifaceted shapes. (These combinations of shapes can also be used for providing non-rotation/limited rotation capability between the spindle nut 28 and the piston body 18.)

In some embodiments, footing 5 can include a cavity or recess in the first face. The cavity can be sized, positioned and shaped so as to provide a desired degree of resilience to the footing 5 when force is being applied to the footing by the core 26.

Spindle Nut and Core

Figure 12:
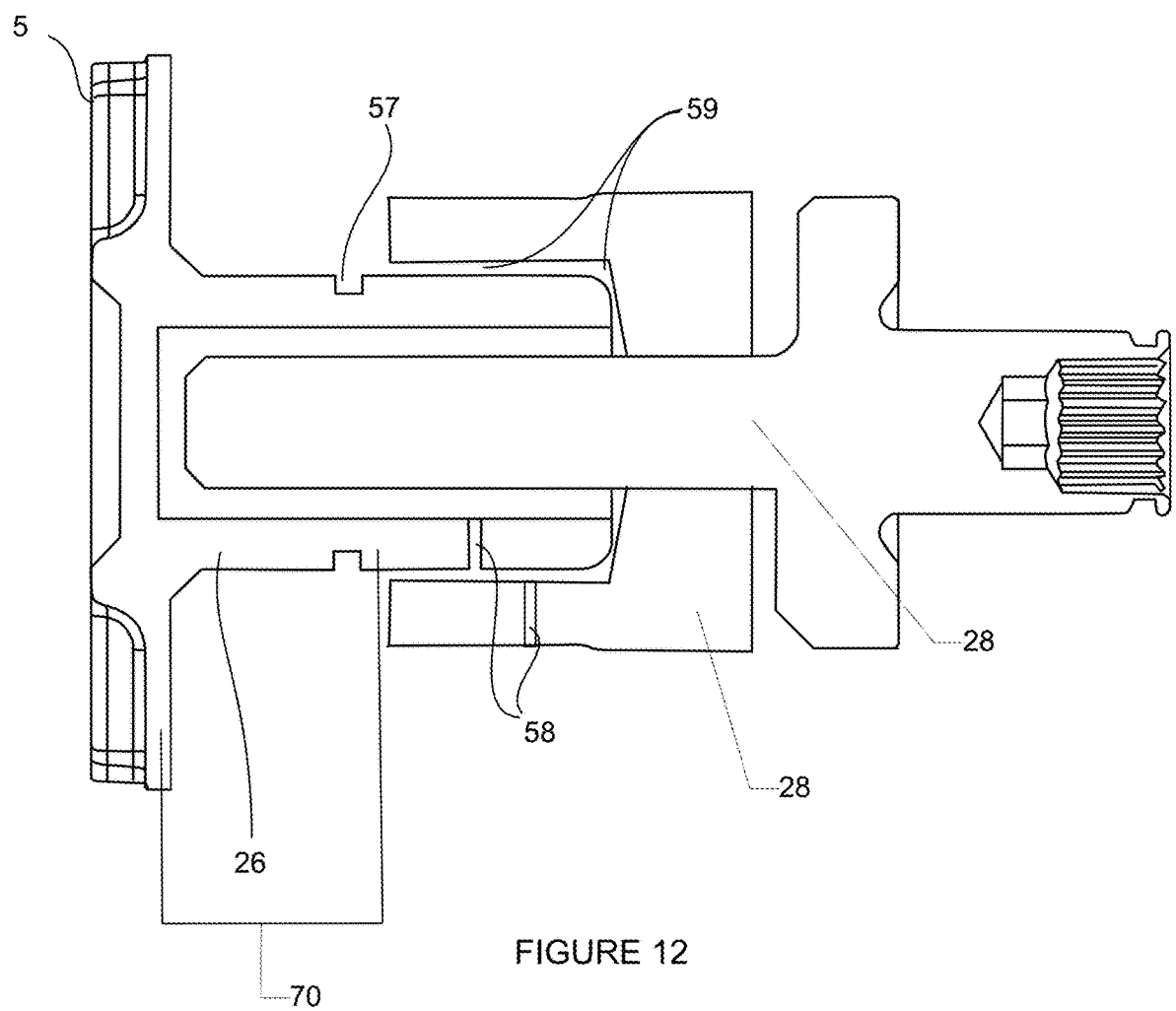
FIG. 12 shows an embodiment of a brake piston with a load bearing column construction.

The spindle nut 28 can convert the rotary movement of spindle 27 into horizontal movement of the spindle nut 28 which pushes against the core 26 which in turn pushes against footing 5 which in turn pushes against brake pad 7. In some embodiments, spindle nut 28 can utilize a threaded connection between the spindle 27 and the spindle nut 28 together with a rotation limiting feature to convert the movement of spindle 27 to the linear or horizontal movement of spindle nut 28. In some embodiments, the rotation limiting feature can comprise the outer surface of the spindle nut 4 which contacts an inner surface of piston body 18 or core 26 to limit or prevent rotation of the spindle nut 28. In some embodiments, a rotation limiting feature can include a nonrotating joint between the core 26 and the spindle nut 28, such as a sliding nonrotating joint comprising interacting surfaces of the outer diameter of spindle nut 28 and an inner surface of piston body 18 or core 26. In some embodiments, a rotation limiting feature for spindle nut 28 can include interfering portions of spindle nut 28 and core 26. FIG. 12 shows an embodiment of a sliding nonrotating joint between core 26 and spindle nut 28 where the core 26 is received into the nut 28. FIGS. 5b and 6 show embodiments where the nut 28 is received into the core 26. Also shown in FIG. 12 are retainer groove 57, through hole 58 and channel 56. In some embodiments, channel 56 and through hole 58 can provide a flow path such as can be useful for filling, draining and/or bleeding the brake system with fluid and for allowing the flow of fluid as the brake parts move. In some embodiments, hydraulic fluid or pneumatic gas can provide brake actuating pressure to the internal cavity 34 in a central part of core 26 to act on and push on footing 5 to provide braking force.

In one embodiment of interfering portions of spindle nut 28 and core 26, spindle nut 28 can include one or more splines, sockets, recesses, protrusions, and/or one side of corresponding parts which interact with one or more corresponding splines, sockets, recesses, protrusions and/or other side of corresponding parts to limit or prevent relative rotation of spindle nut 28 and core 26.

Additional features that can be present on core 26 and spindle nut 28 can include through holes, channels, passages and like which facilitate filling of the piston with a fluid which actuates the brakes (e.g. brake fluid, hydraulic oil, gas, air and the like) and can also allow the purging of unwanted gases or liquids from the piston. Such functionality can be especially helpful to allow the venting or "bleeding" of air from the brakes when brake fluid or hydraulic oil is used. In addition, such functionality can be especially helpful to allow draining of fluids when gas or air is used to actuate the brakes.

Through holes can be provided at various locations on the core 26 including at a high point, a low point, or an intermediate point. Channels can be included at various locations, such as at the end of core 26 proximate spindle nut 28 to provide a passage between an opening in the central portion of the core 26 to the internal cavity of the piston body 18. Additional locations for channels include on a surface of the hollow 36 of the spindle nut 28 to provide a passage between the central portion of core 26 to the internal cavity of piston body 18, as well as along the splines or along the corresponding features of the spindle nut 28 and core 26. In some embodiments, a passage can be provided by over sizing or under sizing one of the corresponding parts or a portion of one of the corresponding parts such as by using a larger diameter, a smaller diameter, etc. Passages can also be provided between the spindle nut 28 and the inner surface of piston body 18. In addition, when anti-rotation features are provided between the spindle nut 28 and core 26, the entire spindle nut 28 can in some embodiments be sized to be smaller than the inner diameter of piston body 18 to more freely allow the movement of gases and liquids around spindle that 28 and through the piston.

In some embodiments, core 26 can comprise a single piece or two or more pieces. When two or more pieces are used for core 15, they can have interlocking features or otherwise have features to prevent relative rotation between the two or more parts. In some embodiments, a channel, hole, or passage can be provided at the junction between two pieces of core 26. In one embodiment, such as when interlocking crenellations or teeth are provided, one or more of the crenellations or teeth can be missing to provide a channel or additional slots or grooves can be made to provide a channel.

Construction of Footing and Core

In some embodiments, the footing 5 and core 26 can be made as a single piece, such as by molding, forging, punching, spinning or casting as well as other suitable methods for fabricating parts of the desired complexity from the selected material/materials. In some embodiments, the footing 5 can be made separate from core 26 and then attached to one another. Suitable methods of attachment include welding, gluing, soldering, cementing, brazing, threading, pinning, clipping, as well as other methods of attachment suitable for the materials being joined and the forces being resisted.

In one embodiment, footing 5 can be made from a blank of circular material or material of another suitable shape which is then punched or coined into a desired final or intermediate shape. Core 26 can be a tubular material or be made from a tubular material which is welded or spin welded into position on/in footing 5. In some embodiments, core 26 will fit into a socket or fit into a whole in footing 5 for attachment.

In some embodiments, core 26 and footing 5 can be assembled by passing core 26 through the footing and core 26 being affixed to the footing 5. In some such embodiments, the portion of the core 26 extending through footing 5 can also form at least a portion of the face of footing 5 proximate brake pad 7. In some such embodiments, the portion of core 26 passing through footing 5 can form at least a portion or all of the face of footing 5 which contacts brake pad 7 or contacts the intervening structure between the footing 5 and brake pad 7. In some embodiments, the portion of the core 26 extending through footing 5 can form one or more anti-rotation lugs or recesses.

Core-Body Coupler

In some embodiments, a coupler 44 can be present between the core 26 and the piston body 18. The coupler 44 can be present in a core recess 46 in an outside wall of core 26, or the coupler 44 can be present in a body recess 45 in an outside wall of piston body 18. In some embodiments, coupler 44 can be present in both a core recess 46 and a body recess 45, such as is shown in FIG. 5*b* and FIG. 14.

The coupler 44 and core recess 46 can be configured to exert a retracting force on the core to force the footing against the piston body 18. In some embodiments, the actuation of the parking brake can move the spindle nut against the core, moving the core in a lateral direction toward the brake pad 7 to exert a braking force against the rotor 8. Upon movement of the core 26 in relation to the piston body 18, the coupler 44 can compressed by the core recess 44. In some embodiments, a sloped surface 63 or a step in the core recess 46 can push against the coupler 44 to compress. In some embodiments, a sloped surface 63 or a step in the core recess 46 can push against the coupler 44 which pushes against a step or sloped surface of the body recess 45. Upon release of the parking brake, the compression of the coupler 44 can be relieved, allowing the coupler 44 to move the core 26 to move the footing 5 against piston body 18 or a material intervening between footing 5 and piston body 18.

In some embodiments, coupler 44 can encircle core 26. In some embodiments, coupler 44 can form a seal between core 26 and piston body 18 against brake-actuating fluid, such as brake fluid, hydraulic fluid or air. In some embodiments, the coupler 44 can be an O-ring. Coupler 44 can be any suitable material which can provide a restoring force. Suitable materials can include polymers and elastomers. In some embodiments, body recess 45 can be a groove that runs completely around an inner diameter of body 18 and/or core recess 46 can be a groove that runs completely around an outer diameter of core 26. In some embodiments, body recess 45 and/or core recess 46 can be configured to receive an O-ring.

Figure 15C:
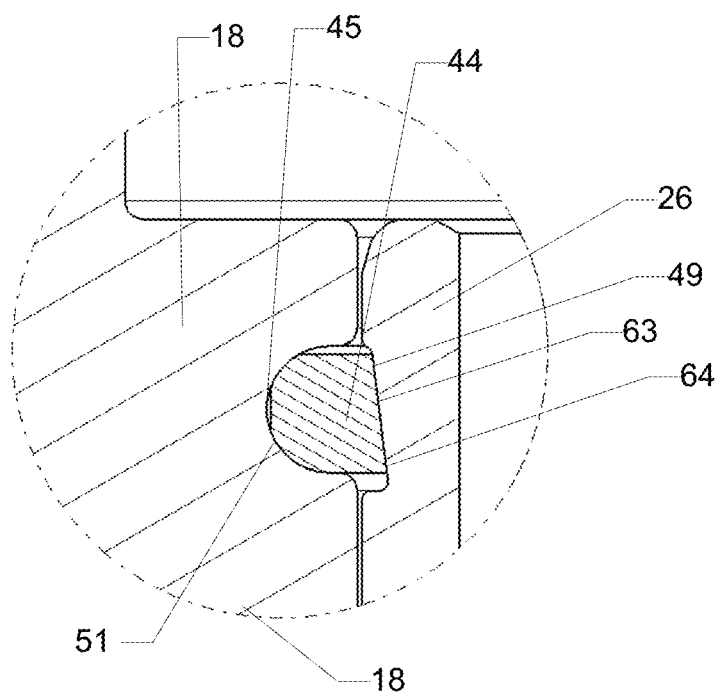
Figure 15D:
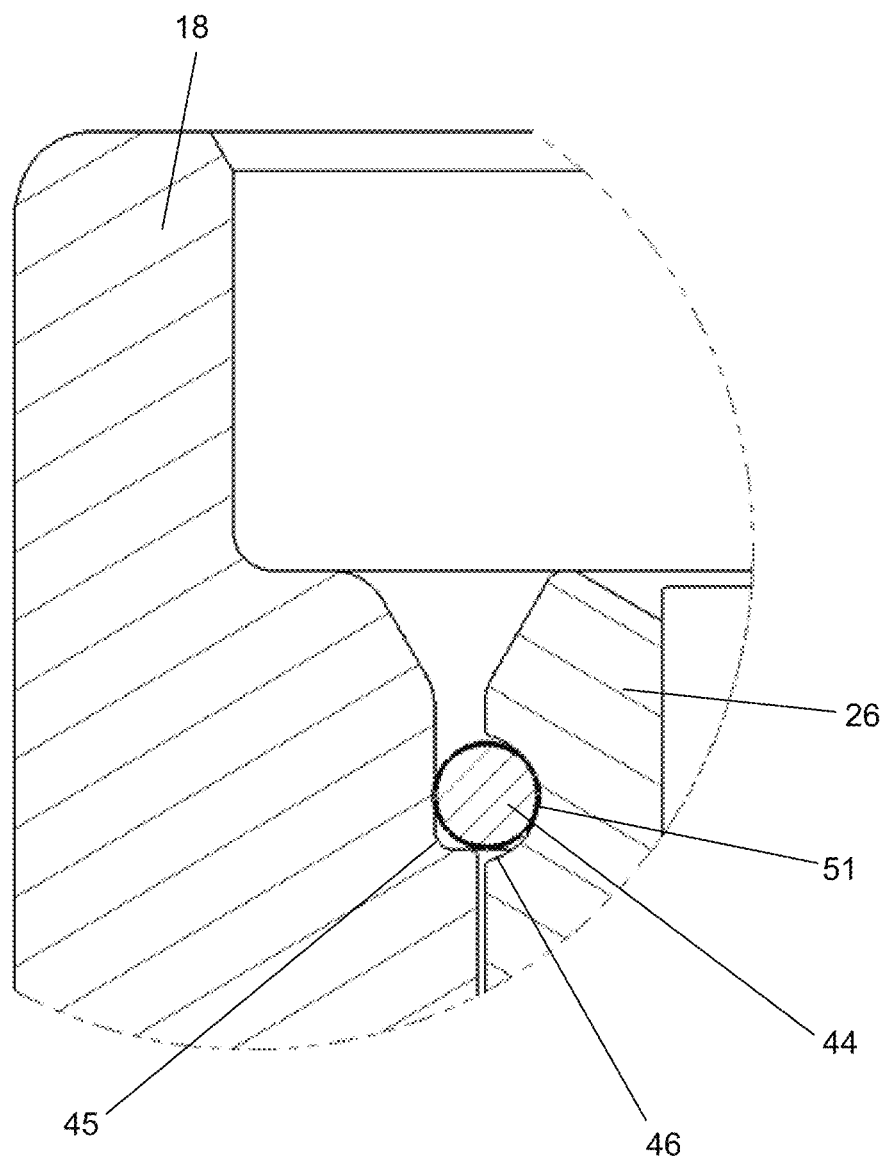

Various embodiments of coupler and corresponding body recess 45 and core recess 46, such as those shown in FIG. 14, and including embodiments where body recess 45 and/or core recess 46 are grooves that run completely around an internal diameter of the body 18 or an outer diameter of core 26, can include different combinations of round surface(s), flat surface(s), sloped surface(s) and combinations thereof such as those embodiments shown in FIGS. 15*a-d*. In one embodiment, the core recess can include a sloped surface 63 such as that shown in FIG. 15*a*. Sloped surface 63 can have a distal portion 64 and a proximal portion 49, where the proximal portion 49 is closer to the end of the core 26 opposite the footing 5 and the distal portion 64 is closer to the end of the core 26 adjacent the footing 5. As shown in FIG. 14, proximal portion 49 can be located further away from the central axis 20 than the distal portion 64. In some embodiments, both the core recess and the piston body recess can include sloped surfaces 63 and 50 as shown in FIG. 15*b*. FIG. 15*b* shows that in some embodiments the sloped surface 50 can have one portion, such as a proximal portion that is closer to the central axis 20 of the piston than a distal portion of the sloped surface 50. In some embodiments, a sloped surface 63 in core recess 46 can be used in conjunction with a rounded surface 51, such as is shown in FIG. 15*c*. FIG. 15*d* shows that in some embodiments, a rounded surface 51 can be present in the core recess 46, with a straight surface in the body recess. In some embodiments, a rounded surface 51 in the core recess 46 can be paired with a sloped surface 50 in body recess 45. In some embodiments a rounded surface 51 can be present in both the core recess 46 and the body recess 45. In some embodiments, the body recess 45 can be seen as a step when viewed in cross-section as in FIG. 15a. In some embodiments, the core recess 46 can be seen as a step when viewed in cross-section. In some embodiments, the core recess can be have a rounded surface as a part of, in place of or in cooperation with sloped surface 63. In some embodiments, the body recess 45 and the core recess 46 can subject coupler to double shear when the parking brake is in an activated state and the spindle nut 28 is pushing on the load bearing column 70 comprising a footing 5 and a core 26.

Seals

Figure 16:
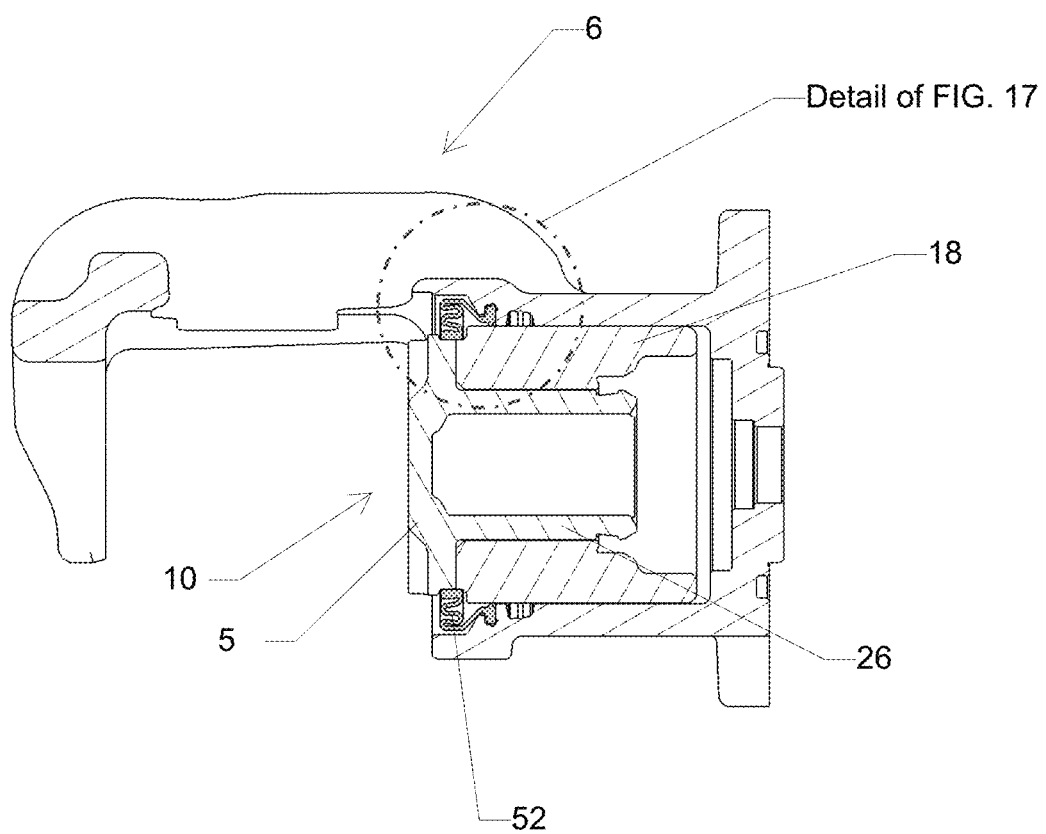
FIG. 16 shows an embodiment of a boot for an embodiment of a brake piston.
Figure 17:
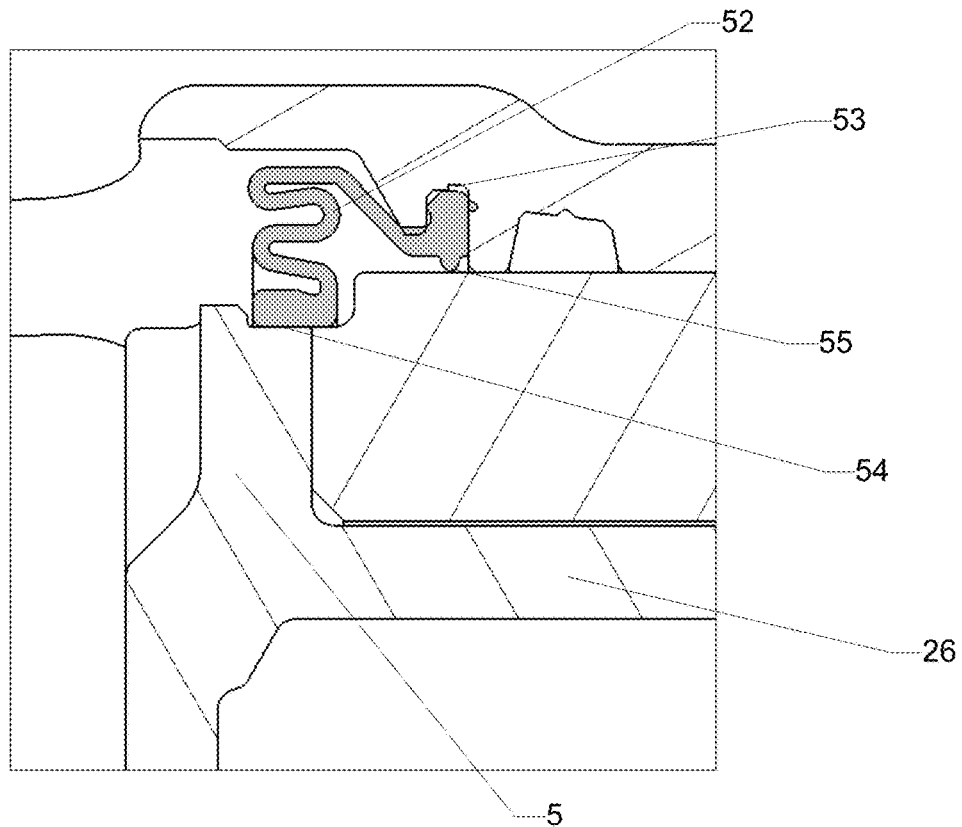
FIG. 17 is a detail from FIG. 16.

In some embodiments, the brake system can include a seal between the caliper and the brake piston. Suitable seals can include boot seals such as shown in FIG. 16. In one embodiment, such as that shown in FIG. 17, the boot 52 includes a first contact surface which contacts the caliper and prevents intrusion of foreign material, such as one or more of dust, solids, liquids, grease, water, oil and dirt. In some embodiments, such as shown in FIG. 17, the boot seal 52 can include a second contact surface 54 which contacts an outer surface of piston body 18 and/or an outer surface of footing 5 and the second contact surface prevents intrusion of foreign material, such as one or more of dust, solids, liquids, grease, water, oil and dirt. In some embodiments, such as shown in FIG. 17, the second contact surface can contact both the outer surface of footing 5 and outer surface of piston body 18. In some embodiments, the second contact surface is longer than the distance that the footing moves in relation to the piston body during operation of the parking brake, allowing the second contact surface to bridge a gap that occurs between the footing and piston body during parking brake operation. In some embodiments, boot seal 52 can include a third sealing surface 55 which contacts an outer surface of the body 18. In some embodiments, the second sealing surface 54 can contact a different portion of the piston body 18 than the third sealing surface 55. In some embodiments, first, second and third contact surfaces 53, 54 and 55, respectively, can all be present. In some embodiments, less than all of first, second and third contact surfaces can be present. In some embodiments, the boot seal can include a first contact surface contacting the brake, a second contact surface contacting the footing and a third contact surface contacting the piston body, wherein one or more of the contact surfaces prevent intrusion of foreign material, such as one or more of dust, solids, liquids, grease, water, oil and dirt. In some embodiments, boot seal 52 can include a third sealing surface 55

Core-Spindle Nut Retracter

Figures 18A, 18B, 18C:
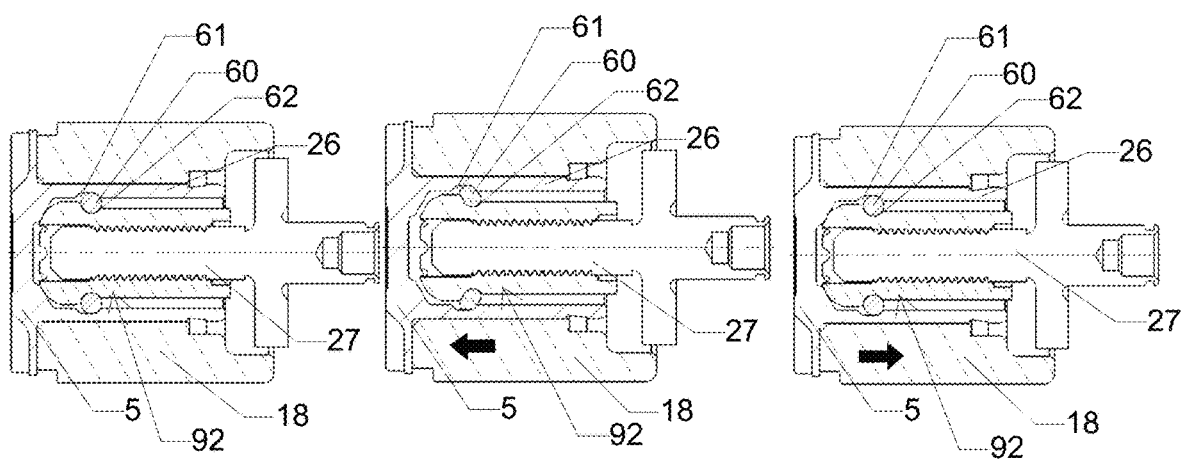
FIGS. 18a-c show an embodiment of a retractor for an embodiment of a brake piston.

In some embodiments, a retractor 60 can be present between the core 26 and the spindle nut 28, such as is shown in FIGS. 18a-c. In some embodiments, retractor 60 can be located between recesses 61, 62 in the outer surface of spindle nut 28 and inner surface of the core 26, respectively. The retractor 60 and the corresponding recesses 61 and 62 in the core 26 and spindle nut 28 can be configured to provide a retractive force to the core 26 which can in turn apply a retractive force to the piston body 18 during actuation of the brakes using fluid pressure applied to the piston body 18 and/or other portions of a brake system. In some embodiments, application of fluid pressure moves the piston body 18 which in turn moves the footing 5 and core 26 in relation to the spindle nut 28. The relative movement of the core 26 and the spindle nut 28 can distort or compress the retractor 60 between the core 26 and the spindle nut 28. This compression or distortion can provide a restoring force between the core 26 and the nut 28, wherein upon release of the fluid pressure acting within the brake system, the restoring force moves the piston body 18 and/or the footing 5 to a retracted position. This is illustrated in FIGS. 18a-c with FIG. 18a showing the brake piston 10 in a condition where the brakes are not actuated. FIG. 18b shows the brake piston when the brakes are actuated. FIG. 18b shows the piston body 18 and core 26 and footing 5 displaced laterally from the spindle nut 28, distorting/compressing the retractor 60. The distortion of the retractor 60 results in the retractor providing a restoring force opposing the relative movement of the core and the nut. (In some embodiments, the retractor can be located between the footing and the nut, wherein the restoring force would act on the footing and nut and oppose relative movement of the core and the nut.) FIG. 18c shows the brake piston 10 after the brake actuation has ceased and the retractor 60 has returned the core 26, footing 5 and piston body 18 to the position relative to nut 28 shown in FIG. 18a.

In various embodiments, different materials can be used for the retractor, such as plastics or elastomers which are sufficiently resilient to retract the core/footing/piston body in relation to the spindle nut.

In some embodiments, the retractor 60 can be an O-ring, such as a circular O-ring, a square-cut O-ring, or another shape of O-ring such as quad ring, x-ring, v-ring, and the like. In some embodiments, the recess in the core and/or the recess in the nut can run completely around the core/nut. In some embodiments, the recess in core 61 and/or the recess in nut 62 can be sized and configured to receive an O-ring.

In various embodiments, the core recess 61 and the spindle nut recess 62 corresponding to the retractor can be configured with one or more round surfaces, flat surfaces, sloped surfaces and combinations thereof to provide a retractive force during operation and to retain the retractor in place during operation.

In some embodiments, not all features shown in the figures, are included. In addition, other features can be added without departing from the spirit and scope of the present disclosure.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the

CONCEPTS

Concept 1. A piston configured for use in a disk brake system, the piston comprising:
a body having an outside width perpendicular to a central axis;
a footing disposed at a distal end of the piston;
wherein the footing is configured to exert force on a brake pad during actuation of the disk brake system;
the footing having a face configured to contact the brake pad, the face having a length and a width, wherein the length is longer than the outside width of the body, and the length is greater than the width.

Concept 2. The piston of Concept 1, wherein the brake pad has a thickness, a length and a width, the brake pad in use being oriented with the length being oriented along a direction of rotation of a rotor in operational communication with the brake pad, the length of the footing being aligned with the length of the brake pad.

Concept 3. The piston of Concept 2, further comprising:
a core;
a spindle and
a nut;
wherein the core comprises an elongate structure disposed within the body, the core having a proximal and a distal end, the distal end being located proximate the distal end of the piston and attached to the footing; the core having a central space open to the proximal end of the core, the central space configured to receive the nut and the nut is threadably connected to the spindle.

Concept 4. The piston of Concept 3 wherein the footing further comprises an extension, the extension configured to be in communication with the brake pad and/or a brake caliper housing to align the footing with the brake pad.

Concept 5. The piston of Concept 3, wherein the footing further comprises a recess, the recess configured to be in communication with the brake pad and/or a brake caliper housing to align the footing with the brake pad.

Concept 6. The piston of Concept 4, the footing further comprising a recess, the recess configured to be in communication with the brake pad and/or the brake caliper housing to align the footing with the brake pad.

Concept 7. The piston of Concept 3, wherein the footing comprises two extensions, wherein each of the extensions is aligned along a long axis of the brake pad.

Concept 8. The piston of Concept 3, wherein the nut is threadably connected to the spindle as a ball screw, wherein the spindle comprises an inner helical raceway and the nut comprises an outer helical raceway, and the first and second helical raceways contain a set of balls that move along the inner and outer helical raceways and through a recirculation loop as the spindle and nut rotate relative to one another.

Concept 9. The piston of Concept 8, wherein the recirculation loop is located in the nut.

Concept 10. The piston of Concept 8, wherein the recirculation loop is located in the core, and the balls are circulated through the recirculation loop by way of passages in the nut.

Concept 11. The piston of Concept 8, wherein the recirculation loop is located in the body, and the balls are circulated through the recirculation loop by way of passages in the nut and the core.

Concept 12. The piston of Concept 8, the recirculation loop comprising a secondary outer helical raceway and a corresponding secondary inner helical raceway, the secondary inner helical raceway being located on a surface of the nut and secondary outer helical raceway being located on a surface of the core.

Concept 913. A piston assembly comprising:
the brake piston of Concept 1;
a brake pad;
a brake caliper housing;
wherein, the brake pad is fitted to the caliper housing and configured to apply braking force to a rotor in operational communication with the piston assembly, and
the brake piston is located within a cylinder located in the brake caliber housing, the footing of the brake piston located adjacent the brake pad; and
the brake pad comprising clips configured to clip to the footing.

Concept 14. The piston assembly of Concept 13, wherein the clips are configured to align the footing with the brake pad.

Concept 15. The piston assembly of Concept 13, wherein the clips are configured to retract the brake pad as the brake piston retracts.

Concept 16. The brake piston of Concept 3, further comprising a core-body coupler, wherein core includes a core recess, the body includes a body recess and the core-body coupler is located in the core recess and the body recess.

Concept 17. The brake piston of Concept 16, wherein the core recess includes a sloped surface and the sloped surface is configured to exert compression on the core-body coupler when the core is moved toward the distal end of the body, and the core-body coupler exerts a retracting force on the core to force the footing against the body.

Concept 18. The brake piston of Concept 16, wherein the core recess includes a sloped surface having a distal end and a proximal end where the proximal end is located further from the central axis of the piston than the distal end.

Concept 19. The brake piston of Concept 16, wherein the core-body coupler forms a seal between the body and the core to prevent passage of brake fluid.

Concept 20. The brake piston of Concept 19, wherein the core-body coupler is an o-ring.

Concept 21. A disk brake piston comprising:
a load bearing column within a piston body, the load bearing column comprising:
a footing configured to push against a brake pad; and
a core extending from the metal footing and slidably located within the piston body; and
a spindle nut located at least partially within the core, the spindle nut having an inner surface configured for functional communication with a spindle, and an outer surface in functional communication with the core, the outer surface having a first portion and the core having a corresponding portion, wherein the first portion and the corresponding portion prevent relative rotation of the core and the spindle nut;

then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

wherein the spindle nut is configured to contact and push the load bearing column which pushes on the brake pad.

Concept 22. The disk brake piston of Concept 21, wherein spindle nut has a distal end proximate the footing, and the distal end of the spindle nut pushes the load bearing column which pushes on the brake pad.

Concept 23. The disk brake piston of Concept 22, wherein the distal end of the spindle nut pushes on the footing which pushes on the brake pad.

Concept 24. The disk brake piston of Concept 22, wherein the distal end of the spindle nut pushes on a portion of the core proximate the footing.

We claim:

1. A disk brake piston comprising:
   a load bearing column within a piston body, the load bearing column comprising:
   a footing configured to push against a brake pad; and
   a core extending from the footing and slidably located within the piston body; and
   a spindle nut located at least partially within the core, the spindle nut having an inner surface configured for functional communication with a spindle, and an outer surface in functional communication with the core, the outer surface having a first portion and the core having a corresponding portion, wherein the first portion and the corresponding portion prevent relative rotation of the core and the spindle nut;
   wherein the spindle nut is configured to push the load bearing column which pushes on the brake pad, and
   wherein an internal cavity for receiving hydraulic fluid to provide braking force is formed between an inner surface of the core and the outer surface of the spindle nut.

2. The disk brake piston of claim 1, wherein the spindle nut has a distal end proximate the footing, and the distal end of the spindle nut pushes the load bearing column which pushes on the brake pad.

3. The disk brake piston of claim 2, wherein the distal end of the spindle nut pushes on the footing which pushes on the brake pad.

4. The disk brake piston of claim 2, wherein the distal end of the spindle nut pushes on a portion of the core proximate the footing.

5. The disk brake piston of claim 1, wherein the core is slidable in an axial direction with respect to the spindle nut.

6. The disk brake piston of claim 1, wherein the footing and the core comprise metallic material and the piston body comprises non-metallic material.

* * * * *